United States Patent
Nakashima et al.

(10) Patent No.: US 8,824,349 B2
(45) Date of Patent: Sep. 2, 2014

(54) MOBILE STATION APPARATUS, COMMUNICATION SYSTEM, COMMUNICATION METHOD AND PROGRAM

(75) Inventors: Daiichiro Nakashima, Osaka (JP); Yasuhiro Hamaguchi, Osaka (JP); Kazunari Yokomakura, Osaka (JP); Jungo Goto, Osaka (JP); Osamu Nakamura, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 79 days.

(21) Appl. No.: 13/255,643

(22) PCT Filed: Mar. 5, 2010

(86) PCT No.: PCT/JP2010/053646
§ 371 (c)(1),
(2), (4) Date: Sep. 9, 2011

(87) PCT Pub. No.: WO2010/104006
PCT Pub. Date: Sep. 16, 2010

(65) Prior Publication Data
US 2012/0002580 A1  Jan. 5, 2012

(30) Foreign Application Priority Data

Mar. 10, 2009 (JP) .................. 2009-056126

(51) Int. Cl.
H04W 52/04 (2009.01)
H04W 72/04 (2009.01)
H04B 7/00 (2006.01)

(52) U.S. Cl.
USPC ........................... 370/311; 370/329; 455/522

(58) Field of Classification Search
USPC ................... 370/225, 249, 311, 329; 455/522
See application file for complete search history.

(56) References Cited

U.S. PATENT DOCUMENTS

| 6,236,864 B1 * | 5/2001 | McGowan et al. ............ 455/522 |
| 2001/0000456 A1 * | 4/2001 | McGowan .................... 370/342 |

(Continued)

FOREIGN PATENT DOCUMENTS

| JP | 2008-61250 A | 3/2008 |
| JP | 2008-252309 A | 10/2008 |

(Continued)

OTHER PUBLICATIONS

3GPP TSG RAN WG1 #56 Meeting R1-090738, Athens, Greece, Feb. 9-13, 2009, pp. 1-4.

(Continued)

*Primary Examiner* — Asad Nawaz
*Assistant Examiner* — Berhanu Belete
(74) *Attorney, Agent, or Firm* — Birch, Sewart, Kolasch & Birch, LLP

(57) ABSTRACT

A mobile station apparatus performs communication with abase station apparatus using a multiple number of component frequency bands, each being a band having a predetermined frequency bandwidth, and includes: a controller setting up a value relating to the transmission power of each component frequency band in accordance with the number of component frequency bands to which radio resources are allocated; and a transmission processor adjusting the transmission power of each component frequency band, based on the value of transmission power set at the controller and transmitting a signal using radio resources of a multiple number of component frequency bands. With this configuration, in a radio communication system using a multiple number of component frequency bands, it is possible to adjust transmission power control in accordance with the number of uplink component frequency bands used for transmission and transmit a signal of a waveform suitable for the radio communication system.

6 Claims, 12 Drawing Sheets

(56) References Cited

U.S. PATENT DOCUMENTS

| | | |
|---|---|---|
| 2004/0202104 A1* | 10/2004 | Ishii et al. ............ 370/225 |
| 2004/0266469 A1* | 12/2004 | Hayashi et al. ......... 455/522 |
| 2008/0057934 A1 | 3/2008 | Sung et al. |
| 2008/0069028 A1* | 3/2008 | Richardson ............ 370/328 |
| 2009/0209279 A1* | 8/2009 | Kuroda et al. .......... 455/522 |
| 2009/0318157 A1 | 12/2009 | Hoshino et al. |
| 2009/0325627 A1* | 12/2009 | Lee ..................... 455/522 |
| 2010/0075689 A1 | 3/2010 | Uemura et al. |
| 2010/0167752 A1 | 7/2010 | Kojima |
| 2010/0273502 A1 | 10/2010 | Uemura et al. |

FOREIGN PATENT DOCUMENTS

| | | |
|---|---|---|
| WO | WO 2008/013173 A1 | 1/2008 |
| WO | WO 2008/093621 A1 | 8/2008 |

OTHER PUBLICATIONS

3GPP TSG RAN WG1 Meeting #55 R1-084226 Prague, Czech Republic, Nov. 10-14, 2008 pp. 1-3.

* cited by examiner

| Radio Resource Allocation Information | Modulation Scheme Coding Rate | Resending Parameter | Transmission Power Control Value | Mobile Station Identifier |
|---|---|---|---|---|
|  |  |  |  |  |

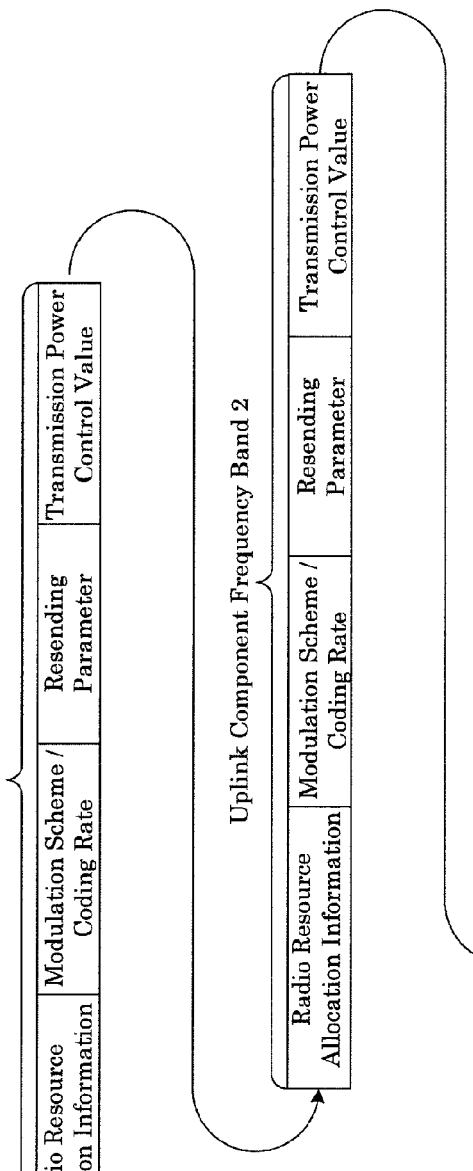

FIG. 14

|     | Uplink Component Frequency Band 1 | Uplink Component Frequency Band 2 | Uplink Component Frequency Band 3 |
| --- | --- | --- | --- |
| Tx1 | MIMO Transmission | MIMO Transmission | MIMO Transmission |
| Tx2 | MIMO Transmission | MIMO Transmission | MIMO Transmission |
| Tx3 | No Transmission | No Transmission | MIMO Transmission |
| Tx4 | No Transmission | No Transmission | MIMO Transmission |

FIG. 15

|     | Uplink Component Frequency Band 1 | Uplink Component Frequency Band 2 | Uplink Component Frequency Band 3 |
| --- | --- | --- | --- |
| Tx1 | MIMO Transmission | No Transmission | MIMO Transmission |
| Tx2 | MIMO Transmission | No Transmission | MIMO Transmission |
| Tx3 | No Transmission | MIMO Transmission | MIMO Transmission |
| Tx4 | No Transmission | MIMO Transmission | MIMO Transmission |

MOBILE STATION APPARATUS, COMMUNICATION SYSTEM, COMMUNICATION METHOD AND PROGRAM

TECHNICAL FIELD

The present invention relates to a mobile station apparatus and the like that perform communication with a base station apparatus by using a multiple number of component frequency bands, each being a band having a predetermined frequency bandwidth.

BACKGROUND ART

As the third generation (3G) radio access scheme for cellular mobile communication, W-CDMA (Wideband Code Division Multiple Access) was standardized in 3GPP (3rd Generation Partnership Project), and cellular mobile communication service based on the scheme has been started. Further, in 3GPP, evolved 3G (Evolved Universal Terrestrial Radio Access; which will be referred to hereinbelow as "EUTRA") and evolved 3G network (Evolved Universal Terrestrial Radio Access Network) have been investigated.

Applied to the EUTRA downlink in the direction of for communication from a base station apparatus to a mobile station apparatus, is an OFDM (Orthogonal Frequency Division Multiplexing) scheme for multi-carrier transmission. On the other hand, a DFT (Discrete Fourier Transmission)-Spread OFDM scheme for single carrier transmission is applied to the EUTRA uplink in the direction communication from a mobile station apparatus to the base station apparatus.

<UL TPC>

In EUTRA, transmission power control is applied to the uplink. In the transmissionpower control in the EUTRA uplink, the average transmission power of SC-FDMA symbols is controlled, and both the open loop transmission power control method and the closed loop transmission power control method are used.

The open loop transmission power control method is a method whereby the mobile station apparatus controls transmission power in accordance with the strength of the signal which the mobile station apparatus receives from the base station apparatus. In EUTRA, transmission power is controlled based on the pass loss calculated from the received power of the downlink reference signal received by the mobile station apparatus.

The closed loop transmission power control method is a method in which the base station apparatus sets up a transmission power control value in accordance with the strength of the signal received from a mobile station apparatus and transmits the transmission power control value to the mobile station apparatus using the downlink control channel while the mobile station apparatus controls transmission power in accordance with the transmission power control value included in the downlink control channel the mobile station receives. There are two control methods in EUTRA: one in which the mobile station apparatus controls transmission power using an accumulation of the transmission power control values that have been notified from the base station apparatus by a multiple number of downlink subframes; and the other in which the mobile station apparatus controls transmission power by directly using the transmission power control value that has been notified to the mobile station apparatus from the base station apparatus by a single downlink subframe. In EUTRA, the transmission power control value transmitted from the base station apparatus to the mobile station apparatus using the downlink control channel for representing radio resource allocation of the uplink shared data channel is formed of two bits. In the case where the mobile station apparatus uses the accumulation of the transmission power control values that have been notified from the base station apparatus by a multiple number of downlink subframes to control transmission power, the transmission power control value [dB] transmitted from the base station apparatus is represented by any value of $\{-1, 0, 1, 3\}$. In the case where the mobile station apparatus absolutely uses the transmission power control value that has been notified from the base station apparatus by a single downlink subframe, to control transmission power, the transmission power control value [dB] transmitted from the base station apparatus is represented by any value of $\{-4, -1, 1, 4\}$.

Further, in EUTRA, the mobile station apparatus controls the average transmission power of SC-FDMA symbols in accordance with the pass loss measured by the mobile station apparatus, and in addition to the parameter of the transmission power control value notified to the mobile station by the base station apparatus, the number of uplink resource block pairs allocated to the uplink shared data channel, the modulation scheme-dependent power offset value based on the modulation scheme applied to the uplink shared data channel, the reference transmission power control value notified to the mobile station apparatus by downlink shared data channel at the time of communication connection or the like, the coefficient to be multiplied with the pass loss measured by the mobile station apparatus, which is broadcast to the mobile station apparatuses within the communication area of the base station using the downlink shared data channel.

The mobile station apparatus compares the transmission power value calculated based on the above parameter with the permissible maximum transmission power value of the average transmission power of its own apparatus, and sets up a transmission power with the lower value.

<Component Carrier Aggregation>

Further, in 3GPP, investigation of the fourth generation (4th Generation; which will be referred to hereinbelow as "4G") radio access scheme (Advanced EUTRA; which will be referred to hereinbelow as "A-EUTRA") of cellular mobile communication and 4G network (Advanced EUTRAN) has begun.

In A-EUTRA, studies have been made aiming at supporting a wider frequency band range than that of EUTRA and securing compatibility with EUTRA. It has been also studied in A-EUTRA that the base station apparatus handles the EUTRA frequency band as one unit (which will be referred to hereinbelow as a component frequency band, and may be also called "Carrier Component" or "Component Carrier" and constructs a radio communication system from multiple component frequency bands (which may also be called as "Spectrum aggregation" or Carrier aggregation"). The base station apparatus performs communication with a mobile station apparatus that supports EUTRA, by way of any one of the component frequency bands, and also performs communication with a mobile station apparatus that supports A-EUTRA, by way of one or more of the component frequency bands.

In A-EUTRA, application of NxDFT-S-OFDM scheme to the uplink has been proposed (see Non-Patent Document 1, for example). The NxDFT-S-OFDM scheme is a scheme in which the mobile station apparatus transmits a signal using a multiple number of component frequency bands based on the DFT-S-OFDM scheme in each component frequency band and the base station apparatus receives the signal.

PRIOR ART DOCUMENTS

Non-Patent Document

Non-Patent Document 1: 3GPP TSG RAN1#55, Prague, Czech Republic, Nov. 10-14, 2008, R1-084226 "Uplink multiple access schemes for multiple component carriers"

SUMMARY OF THE INVENTION

Problems to be Solved by the Invention

The transmission signal to which the aforementioned NxDFT-S-OFDM scheme is applied is a multicarrier signal. Accordingly, when the mobile station apparatus using NxDFT-S-OFDM scheme transmits a signal using a single power amplifier, it is necessary for the mobile station apparatus to control the transmission power of each component frequency band by taking into account the increase of the peak-to-average power ratio; PAPR (Peak-to-Average Power Ratio) in comparison with the case when a single carrier signal to which DFT-S-OFDM scheme is applied is transmitted. In other words, it is necessary to properly control the average input value of the signal to the power amplifier. If the input value of the signal to the power amplifier exceeds the capacity of the power amplifier, there occurs the problem that the waveform of the transmission signal deforms so that the mobile station apparatus cannot transmit a proper signal.

Also, depending on the communication status of multiple mobile station apparatuses inside the communication area of a base station, the number of uplink component frequency bands to which the uplink recourse block pairs are allocated is preferably made to be changeable every uplink subframe in mobile station apparatus so as to make the base station apparatus have high flexibility in scheduling, and transmission power control capable of dealing with this situation is preferable.

In view of the above problems, it is an object of the present invention to provide in a radio communication system using a multiple number of component frequency bands, a mobile station apparatus and the like which can transmit a signal having a waveform suitable for the radio communication system by adjusting transmission power control in accordance with the number of uplink component frequency bands used for transmission.

Means for Solving the Problems

In view of the above problem, a mobile station apparatus of the present invention is a mobile station apparatus that performs communication with a base station apparatus using a plurality of component frequency bands, each being a band having a predetermined frequency bandwidth, comprising: a controller for setting up a value relating to the transmission power of each component frequency band in accordance with the number of component frequency bands to which radio resources are allocated; and, a transmission processor for adjusting the transmission power of each component frequency band based on the value of transmission power set at the controller and transmitting a signal using radio resources of a plurality of component frequency bands.

The mobile station apparatus of the present invention is characterized in that the controller sets up an upper limit value of transmission power for each component frequency band in accordance with the number of component frequency bands to which radio resources are allocated.

The mobile station apparatus of the present invention is characterized in that the controller sets up a transmission power offset value for the upper limit value of transmission power for each component frequency band in accordance with the number of component frequency bands to which radio resources are allocated.

The mobile station apparatus of the present invention is characterized in that the controller sets the upper limit value of transmission power at a lower value as the number of component frequency bands to which radio resources are allocated increases.

The mobile station apparatus of the present invention is characterized in that the controller sets up a transmission power offset value that is greater in a negative direction as the number of component frequency bands to which radio resources are allocated increases.

The mobile station apparatus of the present invention further comprises a reception unit that receives from the base station apparatus, information relating to the upper limit value of transmission power of each component frequency band, depending on the number of component frequency bands to which radio resources are allocated.

The mobile station apparatus of the present invention further comprises a reception unit that receives from the base station apparatus, information relating to a transmission power offset value for the upper limit value of each component frequency band, depending on the number of component frequency bands to which radio resources are allocated.

A communication system of the present invention is a communication system that performs communication between a base station apparatus and a mobile station apparatus using a plurality of component frequency bands, each being a band having a predetermined frequency bandwidth, and is characterized in that the base station apparatus includes a reception processor for receiving a signal transmitted from the mobile station apparatus, using radio resources of plural component frequency bands, and, the mobile station apparatus includes: a controller for setting up a value relating to the transmission power of each component frequency band in accordance with the number of component frequency bands to which radio resources are allocated; and, a transmission processor for adjusting the transmission power of each component frequency band based on the value of transmission power set at the controller, and transmitting a signal using radio resources of a plurality of component frequency bands.

A communication method of the present invention is a communication method for use in a mobile station apparatus performing a base station apparatus using a plurality of component frequency bands, each being a band having a predetermined frequency bandwidth, comprising: a setup step of setting up a value relating to the transmission power of each component frequency band in accordance with the number of component frequency bands to which radio resources are allocated; and, a transmitting step of adjusting the transmission power of each component frequency band based on the value of transmission power set at the setup step and transmitting a signal using radio resources of a plurality of component frequency bands.

A program of the present invention is a program letting a computer for performing communication with a base station apparatus using a plurality of component frequency bands, each being a band having a predetermined frequency bandwidth, execute: a control step of performing control of setting up a value relating to the transmission power of each component frequency band in accordance with the number of component frequency bands to which radio resources are allocated; and, a transmitting step of adjusting the transmission power of each component frequency band based on the value of transmission power set at the setup step and transmitting a signal using radio resources of a plurality of component frequency bands.

Effect of the Invention

According to the present invention, the mobile station apparatus sets up a value relating to the transmission power of each component frequency band in accordance with the number of component frequency bands to which radio resources are allocated, adjusts the transmission power of each component frequency band based on the set value of transmission power, and transmits a signal using radio resources of a multiple number of component frequency bands. Accordingly, the present invention is expected to have such an effect that the input value to the power amplifier can be controlled within a proper range by taking into account variation in PAPR of transmission power that varies depending on the number of the component frequency bands which the mobile station apparatus uses for signal transmission.

According to the present invention, the mobile station apparatus sets up an upper limit value of transmission power for each component frequency band in accordance with the number of component frequency bands to which radio resources are allocated. Accordingly, the present invention is expected to have such an effect that the input value to the power amplifier can be properly controlled within the capacity range of the power amplifier by taking into account variation in PAPR of transmission power that varies depending on the number of the component frequency bands which the mobile station apparatus uses for signal transmission.

According to the present invention, the mobile station apparatus sets up a transmission power offset value for the upper limit value of transmission power for each component frequency band in accordance with the number of component frequency bands to which radio resources are allocated. Accordingly, the present invention is expected to have such an effect that the input value to the power amplifier can be controlled within a proper range by taking into account variation in PAPR of transmission power that varies depending on the number of the component frequency bands which the mobile station apparatus uses for signal transmission.

According to the present invention, the mobile station apparatus sets the upper limit value of transmission power at a lower value as the number of component frequency bands to which radio resources are allocated increases. Accordingly, the present invention is expected to have such an effect that the input value to the power amplifier can be controlled within the capacity range of the power amplifier by taking into account variation in PAPR of transmission power that increases as the number of the component frequency bands which the mobile station apparatus uses for signal transmission increases.

According to the present invention, the mobile station apparatus sets up a transmission power offset value that is greater in the negative direction as the number of component frequency bands to which radio resources are allocated increases. Accordingly, the present invention is expected to have such an effect that the input value to the power amplifier can be controlled within the capacity range of the power amplifier by taking into account variation in PAPR of transmission power that increases as the number of the component frequency bands which the mobile station apparatus uses for signal transmission increases.

According to the present invention, the mobile station apparatus receives from the base station apparatus, information relating to the upper limit value of transmission power of each component frequency band, depending on the number of component frequency bands to which radio resources are allocated. Accordingly, the present invention is expected to have such an effect that the input value to the power amplifier can be controlled within a proper range by taking into account variation in PAPR of transmission power that varies in accordance with the number of the component frequency bands which the mobile station apparatus uses for signal transmission.

According to the present invention, the mobile station apparatus receives from the base station apparatus, information relating to a transmission power offset value for the upper limit value of each component frequency band, depending on the number of component frequency bands to which radio resources are allocated. Accordingly, the present invention is expected to have such an effect that the input value to the power amplifier can be controlled within a proper range by taking into account variation in PAPR of transmission power that varies in accordance with the number of the component frequency bands which the mobile station apparatus uses for signal transmission.

BRIEF DESCRIPTION OF THE DRAWINGS

FIG. 4 is a diagram for illustrating the configuration of

FIG. 12 is a chart showing the number of uplink component frequency bands to which radio resources of uplink shared data channel are allocated and the upper limit value of the average transmission power of each uplink component frequency band.

FIG. 13 is a diagram showing information fields in control data of a downlink control channel.

FIG. 14 is a diagram showing one example of a situation in which a mobile station apparatus performs MIMO transmission through a plurality of uplink component frequency bands.

FIG. 15 is a diagram showing one example of a situation in which a mobile station apparatus performs MIMO transmission through a plurality of uplink component frequency bands.

MODE FOR CARRYING OUT THE INVENTION

Figure 1:
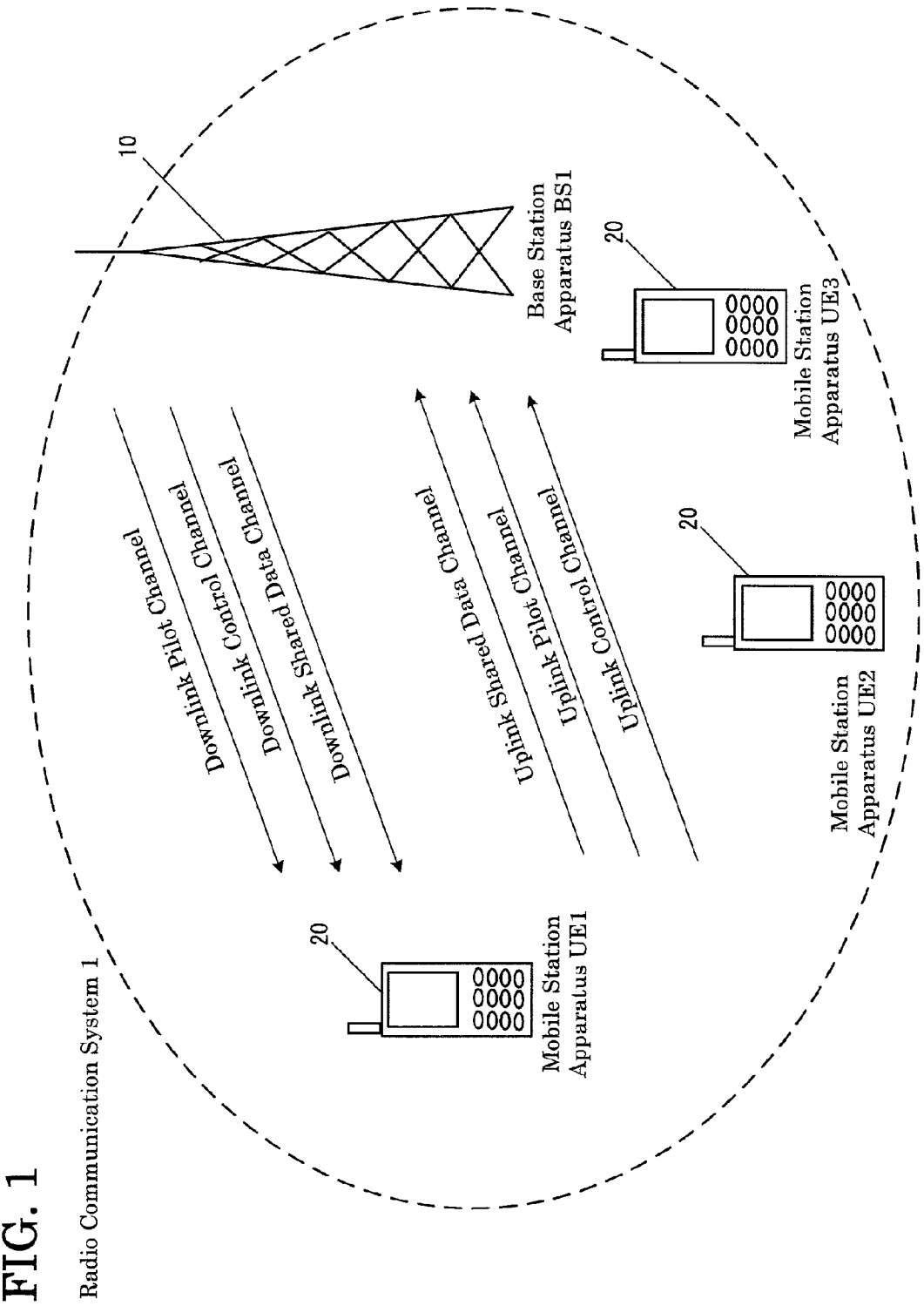
FIG. 1 is a diagram for illustrating the scheme of a radio communication system in the present embodiment.

Next, the embodiment of the present invention will be described in detail with reference to the drawings.

1. Basic Description

To begin with, the basic technology of the downlink configuration and uplink configuration in EUTRA will be described.

[1.1 Downlink Channel Configuration]

First, the schematic configuration of a downlink radio frame in EUTRA will be described. A downlink radio frame is a unit for radio resource allocation etc., and is composed of downlink resource block pairs having a predetermined frequency bandwidth and a time range. One downlink resource block pair is composed of two downlink resource blocks contiguous in the time domain.

One downlink resource block is composed of 12 downlink subcarriers in the frequency domain and composed of 7 OFDM symbols in the time domain. The downlink communication bandwidth of the base station apparatus is called downlink system bandwidth. In the time domain, there exist downlink slots each composed of 7 OFDM symbols, downlink subframes each composed of two downlink slots and downlink radio frames each composed of 10 downlink subframes. Here, the unit defined by one downlink subcarrier and one OFDM symbol is called a downlink resource element. In the downlink radio frame, a plurality of downlink resource blocks are arranged depending on the downlink system bandwidth.

In each downlink subframe, at least a downlink shared data channel to be used for transmission of information data and a downlink control channel to be used for transmission of control data are arranged. Further, a downlink reference signal for downlink pilot channels to be used for channel estimation of downlink shared data channels and downlink control channels are distributed and scattered at multiple downlink resource elements. Here, the downlink reference signal is a known signal that is used for downlink pilot channels.

Arranged in the downlink control channel are signals generated of control data such as mobile station identifiers, radio resource allocation information on downlink shared data channels, radio resource allocation information on uplink shared data channels, transmission power control values for uplink shared data channels, multi-antenna related information, modulation scheme, coding rate, resending parameter and the like.

[1.2 Uplink Channel Configuration]

Subsequently, the schematic configuration of an uplink radio frame in EUTRA will be described. An uplink radio frame is a unit for radio resource allocation etc., and is composed of uplink resource block pairs having a predetermined frequency bandwidth and a time range. One uplink resource block pair is composed of two uplink resource blocks contiguous in the time domain.

One uplink resource block is composed of 12 uplink subcarriers in the frequency domain and composed of 7 SC-FDMA (Single Carrier-Frequency Division Multiple Access) symbols in the time domain. The uplink communication bandwidth of the base station apparatus is called uplink system bandwidth. A plurality of uplink resource blocks are arranged depending on the uplink system bandwidth.

Also in the time domain, there exist uplink slots each composed of 7 SC-FDMA symbols, uplink subframes each composed of two uplink slots and uplink radio frames each composed of 10 uplink subframes. Here, the unit defined by one uplink subcarrier and one SC-FDMA symbol is called an uplink resource element.

In each uplink subframe, at least an uplink shared data channel to be used for transmission of information data and an uplink control channel to be used for transmission of control data are arranged. The uplink control channel transmits control data consisting of a downlink channel quality indicator CQI (Channel Quality Indicators), a reception response ACK/NACK (Acknowledgement/Negative-Acknowledgement) for a downlink shared data channel or scheduling request SR (Scheduling Request).

As to uplink control channels, different kinds of uplink control channels are used, depending on cases, where control data made up of channel quality indicators CQI is transmitted, where control data made up of reception responses ACK/NACK is transmitted, and where control data made up of scheduling requests SR is transmitted. Here, different kinds of uplink control channels have different signal configurations.

The uplink resource block pair to be used for uplink control channels is formed of two uplink resource blocks that have a symmetrical relationship in the frequency domain and are located in different uplink slots. Further, in one uplink resource block, signals of different uplink control channels are code-multiplexed.

Uplink reference signals are distributed to SC-FDMA symbols at different positions depending on cases, where the uplink pilot channel to be used for channel estimation of uplink shared data channels and uplink control channels is arranged in the same uplink resource block as that of the uplink shared data channel, and where arranged in the same uplink resource block as that of the uplink control channel.

Here, the uplink reference signal is a known signal that is used for uplink pilot channels. When an uplink pilot channel is arranged inside the same uplink resource block as that of an uplink shared data channel, the uplink reference signal is distributed at the SC-FDMA symbol in the fourth position inside the uplink slot. When an uplink pilot channel is arranged inside the same uplink resource block as that of an uplink control channel for transmitting control data of channel quality indicator CQI, the uplink reference signal is distributed at the SC-FDMA symbols in the second and sixth positions inside the uplink slot. When an uplink pilot channel is arranged inside the same uplink resource block as that of an uplink control channel for transmitting control data of reception response ACK/NACK, the uplink reference signal is distributed at the SC-FDMA symbols in the third, fourth and fifth positions inside the uplink slot. When an uplink pilot channel is arranged inside the same uplink resource block as that of an uplink control channel for transmitting control data of scheduling request SR, the uplink reference signal is distributed at the SC-FDMA symbols in the third, fourth and fifth positions inside the uplink slot.

2. Description of Radio Communication System

Figure 2:
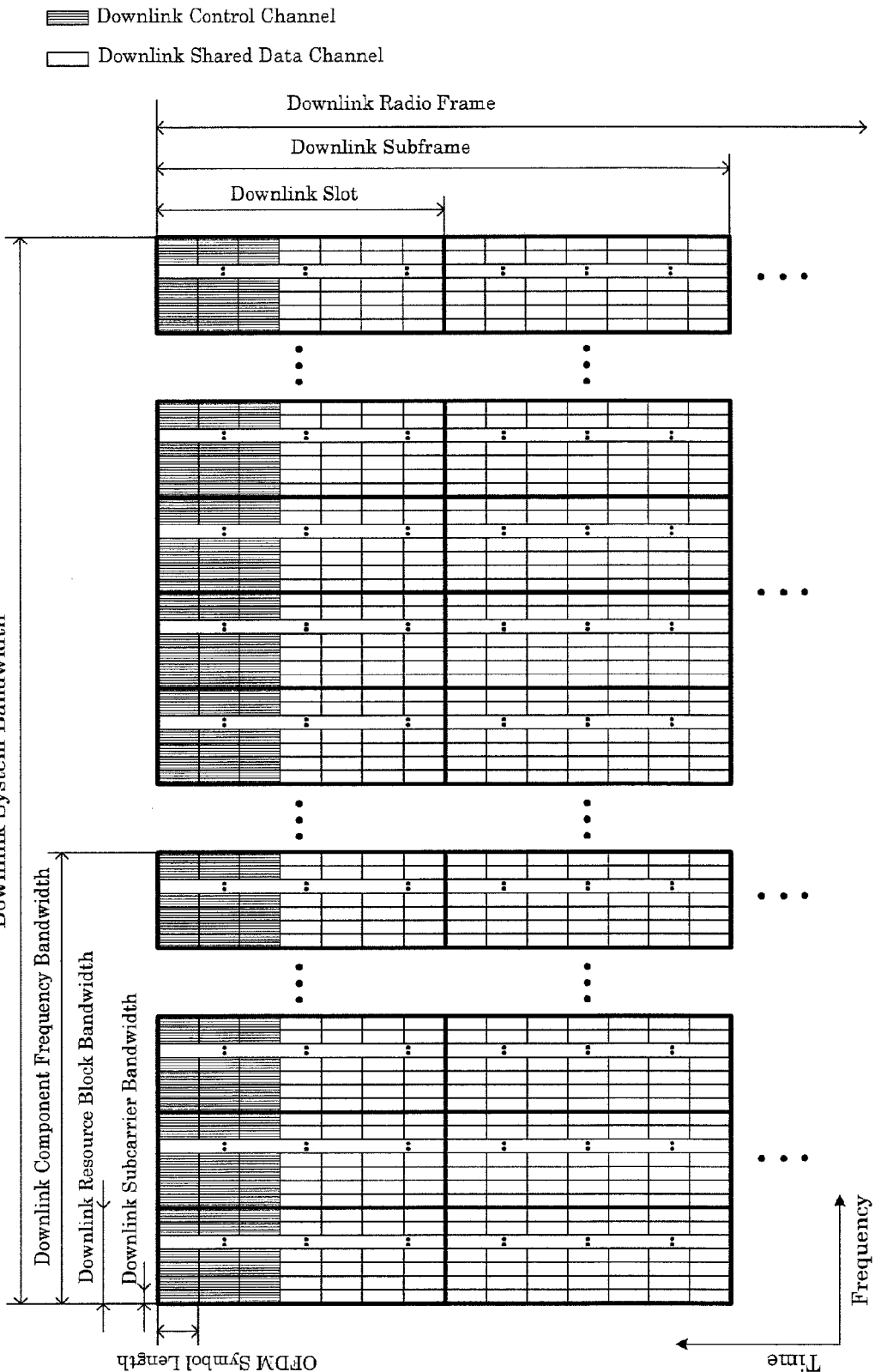
FIG. 2 is a diagram showing a schematic configuration of a downlink radio frame in the present embodiment.
Figure 3:
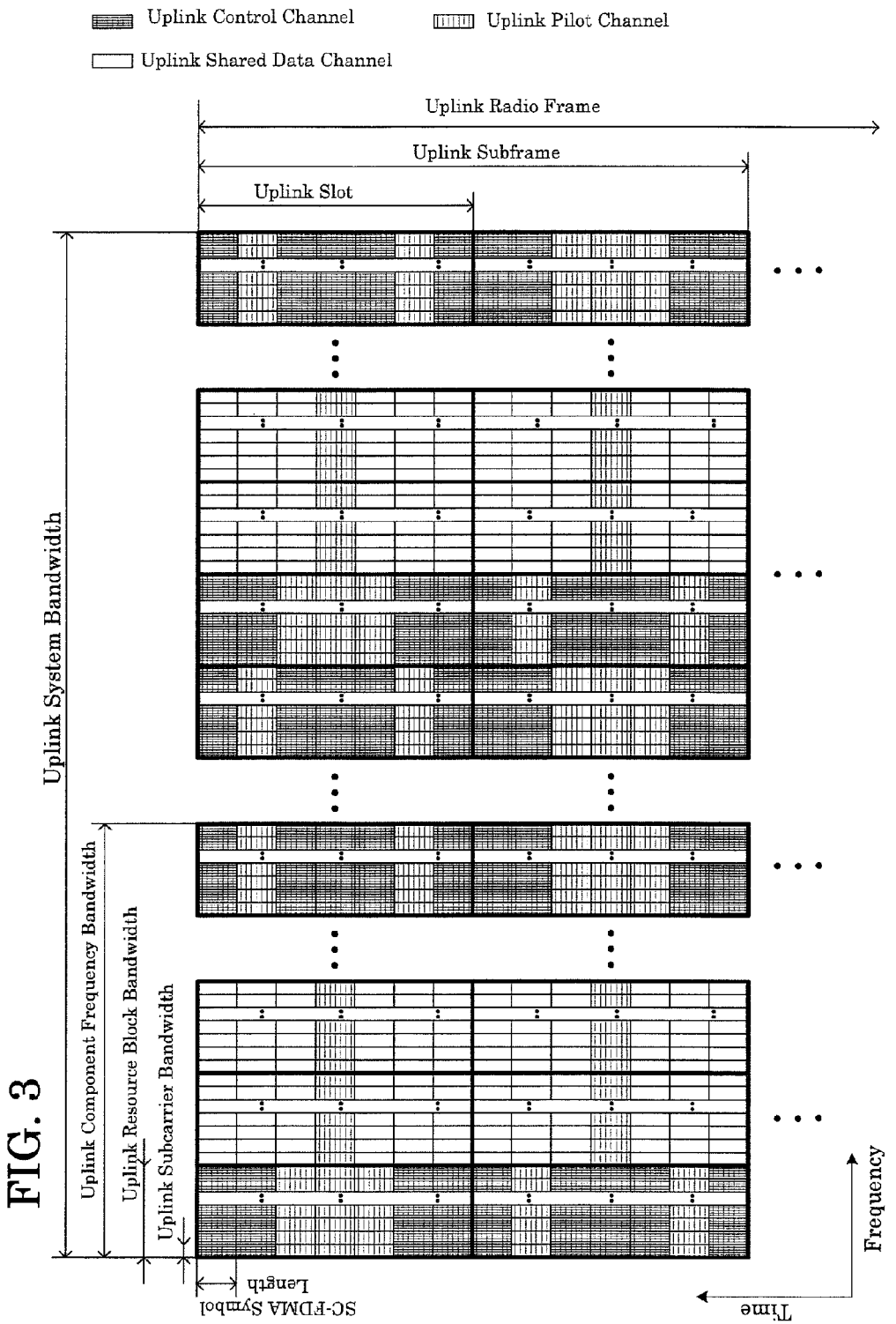
FIG. 3 is a diagram showing a schematic configuration of an uplink radio frame in the present embodiment.

Referring next to FIGS. 1, 2 and 3, the overall picture of the radio communication system according to the present embodiment and the configuration of the radio frame will be described. Then, the configuration of the radio communication system according to the present embodiment will be described with reference to FIGS. 4 to 9. Further, the operating process of the radio communication system according to the present embodiment will be described with reference to FIGS. 10 to 12.

[2.1 Overall Picture of Radio Communication System]

FIG. 1 is a diagram for illustrating the scheme of the overall picture of a radio communication system according to the embodiment of the present invention.

In a radio communication system 1 shown in this drawing, a base station apparatus BS1, multiple mobile station apparatus UE1, UE2 and UE3 perform radio communication.

Further, this drawing shows that the downlink, the communication direction from base station apparatus BS1 to mobile station apparatus UE1, UE2 and UE3, is composed of downlink pilot channels, downlink control channels and downlink shared data channels.

This drawing also shows that the uplink, the communication direction from mobile station apparatus UE1, UE2 and UE3 to base station apparatus BS1 is composed of uplink shared data channels, uplink pilot channels and uplink control channels.

In the present embodiment hereinbelow, base station apparatus BS1 will be called base station apparatus 10, mobile station apparatus UE1, UE2 and UE3 will be called mobile station apparatus 20.

[2.1.1 Downlink Radio Frame Configuration]

FIG. 2 is a diagram showing a schematic configuration of a downlink radio frame from base station apparatus 10 to mobile station apparatus 20 according to the present embodiment.

In this drawing, the horizontal axis presents the frequency domain and the vertical axis presents the time domain. The downlink radio frame is a unit for radio resource allocation etc., and is composed of downlink resource block pairs having a predetermined frequency bandwidth and a time range. One downlink resource block pair is composed of two downlink resource blocks contiguous in the time domain.

In this drawing, one downlink resource block is composed of 12 downlink subcarriers in the frequency domain and composed of 7 OFDM symbols in the time domain. The downlink system bandwidth is the communication bandwidth for the downlink of base station apparatus 10, and is composed of multiple downlink component frequency bandwidths. In radio communication system 1, a downlink component frequency band is a band that has a predetermined frequency bandwidth. For example, the downlink system band with a 60 MHz bandwidth is composed of three downlink component frequency bands of a 20 MHz bandwidth.

In the downlink component frequency band, a multiple number of downlink resource blocks are arranged depending on the downlink component frequency bandwidth. For example, the downlink component frequency band with a 20 MHz bandwidth is composed of 100 downlink resource blocks. Here, as one example, the downlink component frequency bandwidth is a frequency bandwidth that can be used for communication by mobile station apparatus 20 supporting EUTRA, whereas the downlink system bandwidth is a frequency bandwidth that can be used for communication by mobile station apparatus 20 supporting A-EUTRA.

Further, in the time domain shown in this drawing, there exist downlink slots each composed of 7 OFDM symbols, downlink subframes each composed of two downlink slots and downlink radio frames each composed of 10 downlink subframes. Here, the unit defined by one downlink subcarrier and one OFDM symbol is called a downlink resource element.

In each downlink subframe, at least a downlink shared data channel to be used for transmission of information data and a downlink control channel to be used for transmission of control data are arranged. Though unillustrated in this drawing, downlink reference signals of downlink pilot channels to be used for estimation of channel variation of downlink shared data channels and downlink control channels are distributed and scattered at multiple downlink resource elements. Here, the downlink reference signal is a known signal in radio communication system 1 that is used for downlink pilot channels.

Arranged in the downlink control channel are signals generated of control data such as mobile station identifiers, radio resource allocation information on downlink shared data channels, radio resource allocation information on uplink shared data channels, transmission power control values for uplink shared data channels, multi-antenna related information, modulation scheme, coding rate, resending parameter and the like.

[2.1.2 Uplink Radio Frame Configuration]

FIG. 3 is a diagram showing a schematic configuration of an uplink radio frame from mobile station apparatus 20 to base station apparatus 10 according to the present embodiment.

In this drawing, the horizontal axis presents the frequency domain and the vertical axis presents the time domain. The uplink radio frame is a unit for radio resource allocation etc., and is composed of uplink resource block pairs having a predetermined frequency bandwidth and a time range. One uplink resource block pair is composed of two uplink resource blocks contiguous in the time domain.

In this drawing, one uplink resource block is composed of 12 uplink subcarriers in the frequency domain and composed of 7 SC-FDMA symbols in the time domain. The uplink system bandwidth is the communication bandwidth for the uplink of base station apparatus 10, and is composed of multiple uplink component frequency bandwidths. In radio communication system 1, the uplink component frequency band is a band that has a predetermined frequency bandwidth. For example, the uplink system band with a 60 MHz bandwidth is composed of three uplink component frequency bands of a 20 MHz bandwidth. Here in the uplink component frequency band, a multiple number of uplink resource blocks are arranged in accordance with the uplink component frequency bandwidth. The uplink component frequency band with a 20 MHz bandwidth is composed of 100 uplink resource blocks.

Here, the uplink component frequency bandwidth is a frequency bandwidth that can be used for communication by mobile station apparatus 20 supporting EUTRA. As one example, the uplink system bandwidth is a frequency bandwidth that can be used for communication by mobile station apparatus 20 supporting A-SUTRA.

Also in the time domain shown in this drawing, there exist uplink slots each composed of 7 SC-FDMA symbols, uplink subframes each composed of two uplink slots and uplink radio frames each composed of 10 uplink subframes. Here, the unit defined by one uplink subcarrier and one SC-FDMA symbol is called an uplink resource element.

In each uplink subframe, at least an uplink shared data channel to be used for transmission of information data and an uplink control channel to be used for transmission of control data are arranged. The uplink control channel transmit control data consisting of a channel quality indicator CQI for downlink, a reception response ACK/NACK for a downlink shared data channel or scheduling request SR (Scheduling Request).

As to the uplink control channels, different kinds of signal configurations are used depending on cases, where control data made up of channel quality indicators CQI is transmitted, where control data made up of reception responses ACK/NACK is transmitted, and where control data made up of scheduling requests SR is transmitted. Further, the uplink resource block pair used for uplink control channels is formed of two uplink resource blocks that have a symmetrical relationship in the frequency domain inside the uplink component frequency band and are located indifferent uplink slots.

For example, in FIG. 3, inside the uplink subframe in the uplink component frequency band of the lowest frequency, the uplink resource block of the lowest frequency in the first uplink slot in the time domain and the uplink resource block of the highest frequency in the second uplink slot in the time domain constitute one uplink resource block pair used for uplink control channels.

Uplink reference signals are distributed to SC-FDMA symbols at different positions depending on cases, where the uplink pilot channel to be used for estimation of channel variation of uplink shared data channels and uplink control channels is arranged in the same uplink resource block as that of the uplink shared data channel, and where arranged in the same uplink resource block as that of the uplink control channel.

Here, the uplink reference signal is a known signal in radio communication system 1 that is used for the uplink pilot channel. When the uplink pilot channel is arranged inside the same uplink resource block as that of the uplink shared data channel, the uplink reference signal is distributed at the SC-FDMA symbols in the fourth position inside the uplink slot.

When the uplink pilot channel is arranged inside the same uplink resource block as that of the uplink control channel for transmitting control data of channel quality indicator CQI, the uplink reference signals are distributed at the SC-FDMA symbols in the second and sixth positions inside the uplink slot. When the uplink pilot channel is arranged inside the same uplink resource block as that of the uplink control channel for transmitting control data of reception response ACK/NACK, the uplink reference signals are distributed at the SC-FDMA symbols in the third, fourth and fifth positions inside the uplink slot.

When the uplink pilot channel is arranged inside the same uplink resource block as that of the uplink control channel for transmitting control data of scheduling request SR, the uplink reference signals are distributed at the SC-FDMA symbols in the third, fourth and fifth positions inside the uplink slot.

Though this drawing shows the case where the uplink control channel is arranged in the uplink resource block located at the edge in the frequency domain of each uplink component frequency band, the uplink resource block located at the second or third from the edge of the uplink component frequency band may be used for the uplink control channel.

In the radio communication system according to the embodiment of the present invention, OFDM scheme is applied to the downlink while NxDFT-Spread OFDM scheme is applied to the uplink. Here, NxDFT-Spread OFDM scheme is a signal exchange scheme using DFT-Spread OFDM scheme for every uplink component frequency band, and is a method of performing communication using a processor that supports a plurality of DFT-Spread OFDM transmissions and receptions, in the uplink subframes of the radio communication system using a plurality of uplink component frequency bands.

[2.2 Overall Configuration of Base Station Apparatus]

Figure 4:
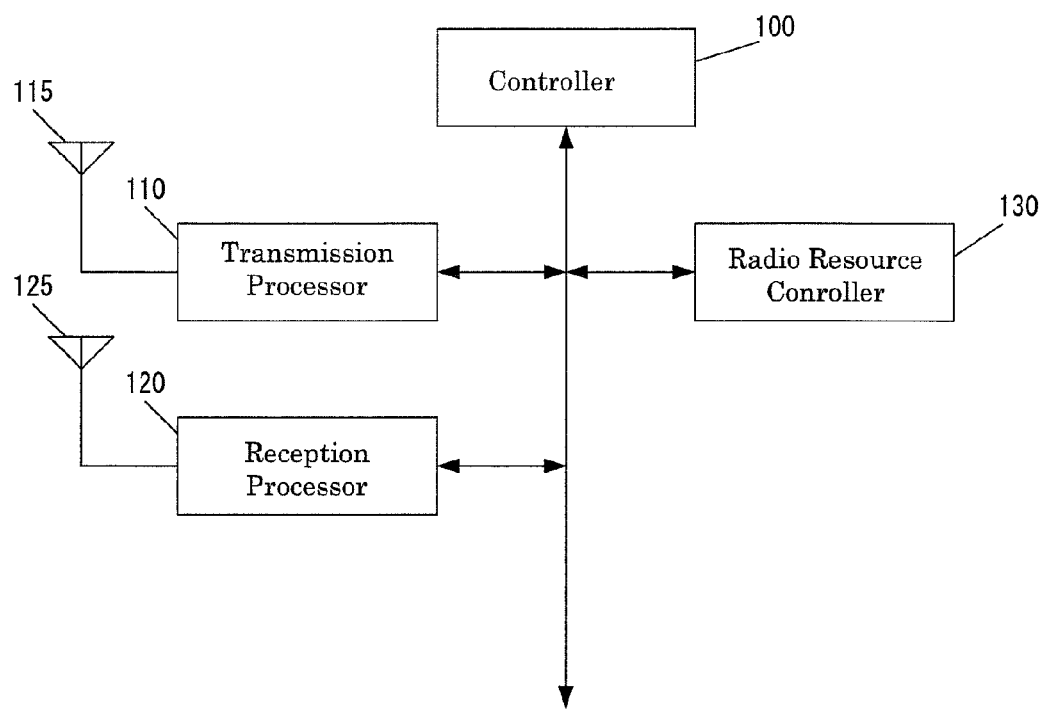
Figure 5:
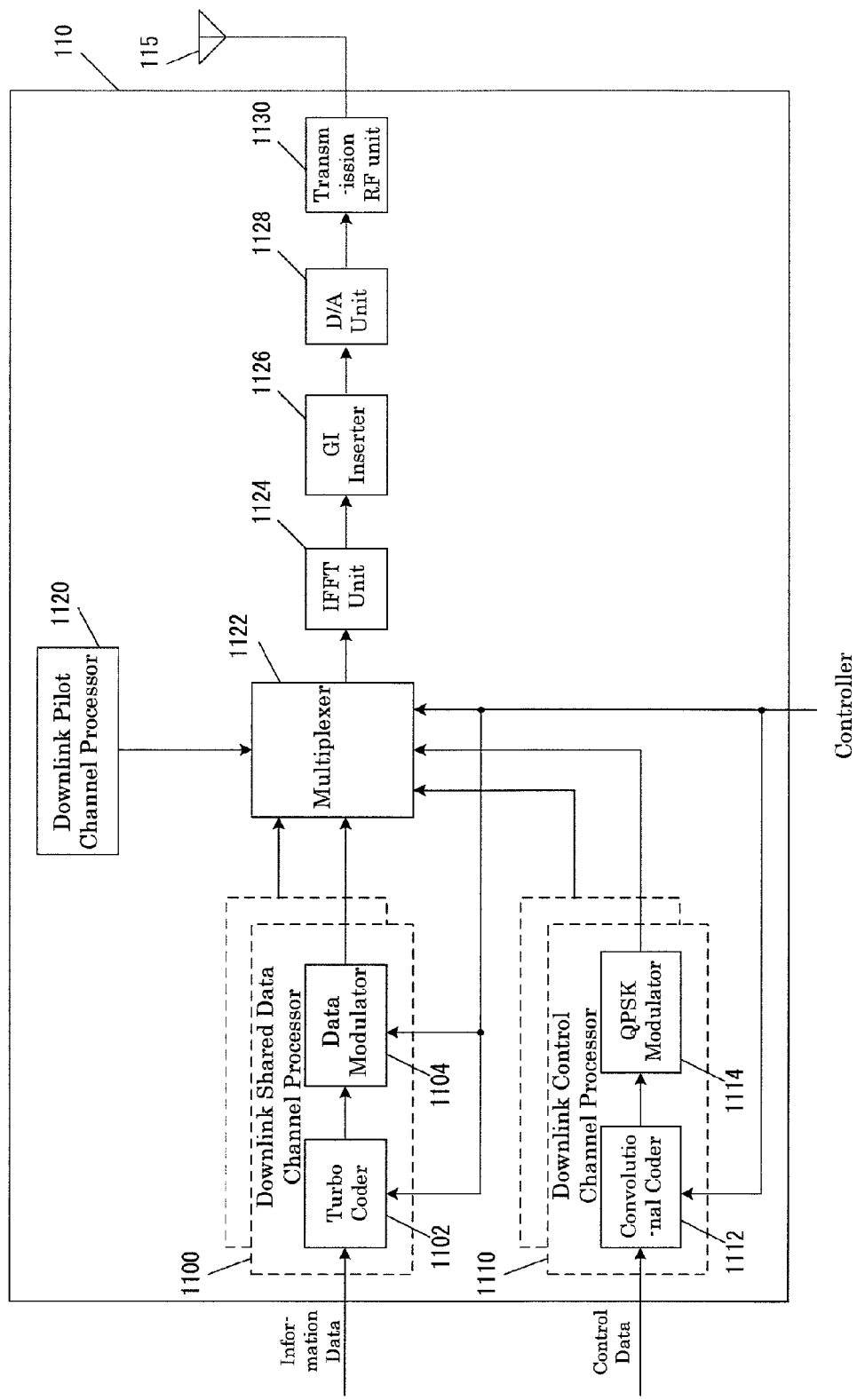
FIG. 5 is a diagram for illustrating the configuration of a transmission processor of a base station apparatus in the present embodiment.
Figure 6:
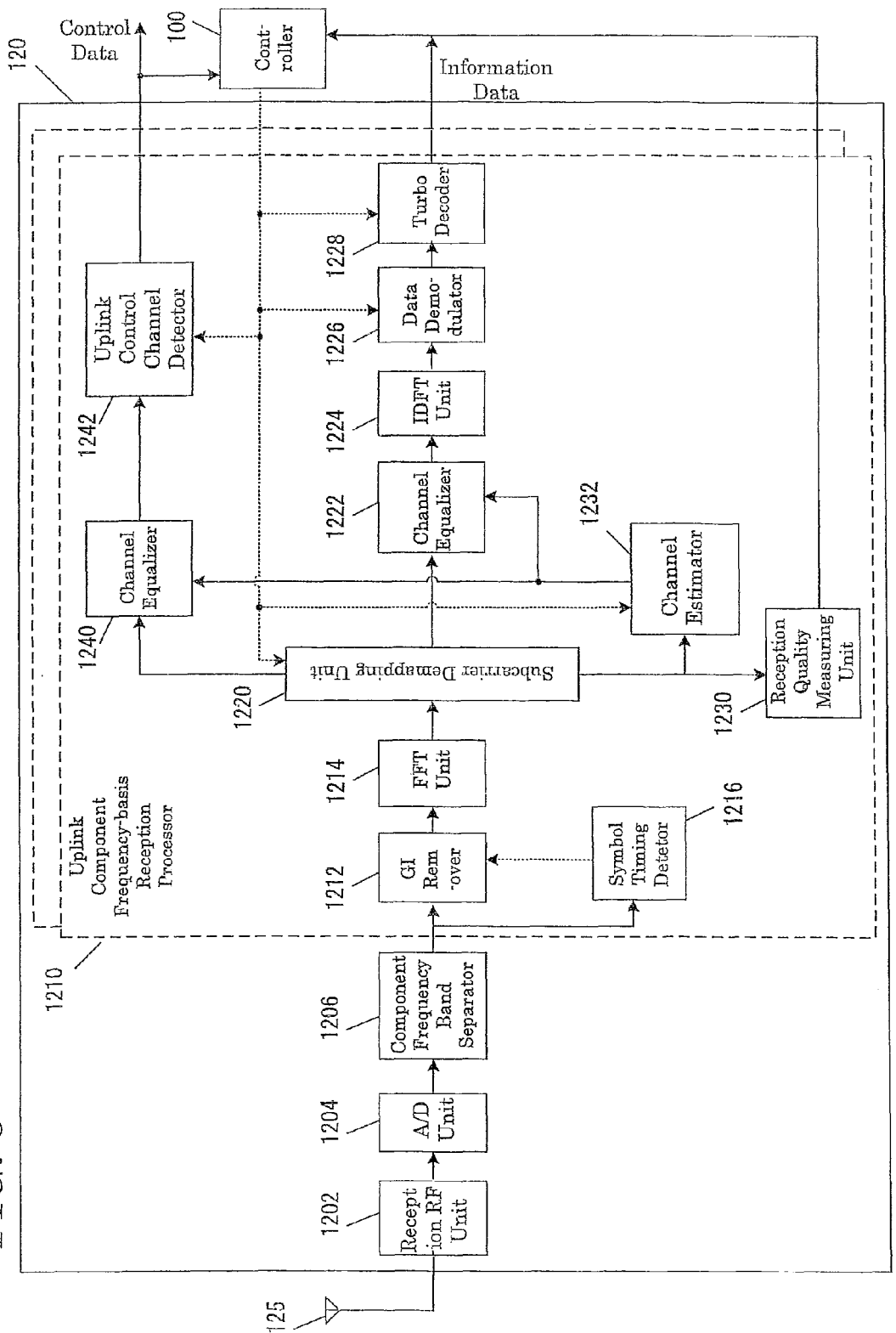
FIG. 6 is a diagram for illustrating the configuration of a reception processor of a base station apparatus in the present embodiment.

Referring next to FIGS. 4, 5 and 6, the configuration of base station apparatus 10 according to the present embodiment will be described.

FIG. 4 is a schematic block diagram showing the configuration of base station apparatus 10 according to the present exemplary embodiment. As shown in this drawing, base station apparatus 10 includes a controller 100, a transmission processor 110, a reception processor 120, a radio resource controller 130. A transmitting antenna 115 is connected to transmission processor 110 and a receiving antenna 125 is connected to reception processor 120.

Controller 100, based on the radio resource control information input from radio resource controller 130, performs control on transmission processor 110 as to radio resource allocation of the downlink shared data channel and downlink control channel, modulation scheme and coding rate. Further, controller 100 generates control data to be transmitted using the downlink control channel based on the radio resource control information, and outputs the control data to transmission processor 110.

Also, controller 100, based on the radio resource control information input from radio resource controller 130, performs control on reception processor 120 as to radio resource allocation of the uplink shared data channel and uplink control channel, transmission power, modulation scheme and coding rate. Further, controller 100 outputs the uplink channel quality input from reception processor 120 to radio resource controller 130.

Further, controller 100, based on the radio resource control information input from radio resource controller 130, generates control data to be transmitted using the downlink control channel, and outputs the control data to transmission processor 110. Controller 100 sets up control data representing a transmission power control value of the uplink shared data channel in accordance with the number of uplink component frequency bands to which radio resources of the uplink shared data channel are allocated.

Transmission processor 110, based on the control signal input from controller 100, generates signals to be transmitted through the downlink control channel and downlink shared data channel and transmits the signals via transmitting antenna 115. Transmission processor 110 transmits the information data input from the upper layer through the downlink shared data channel and transmits the control data input from controller 100 through the downlink control channel.

For example, transmission processor 110 transmits the control data including information on radio resource allocation of the uplink shared data channel and the transmission power control value of the uplink shared data channel to mobile station apparatus 20 through the downlink control channel. Details of transmission processor 110 will be described later.

Reception processor 120, following instructions from controller 100, detects the received signals of the uplink control channel and uplink shared data channel, received from mobile station 20 via receiving antenna 125, demodulates and decodes the signals so as to extract control data and information data. Reception processor 120 outputs the extracted control data to controller 100 and the information data to the upper layer.

Further, reception processor 120 measures the channel quality of the uplink channel (which will be referred to hereinbelow as uplink channel quality) of mobile station 20, based on the received uplink reference signals, and outputs the measured uplink channel quality to radio resource controller 130 via controller 100. Details of reception processor 120 will be described later.

Radio resource controller 130 sets the transmission power of each mobile station apparatus 20, the cycle of intermittent transmission and reception, radio resource allocation of the downlink control channel, radio resource allocation of the uplink control channel, radio resource allocation of the downlink shared data channel, radio resource allocation of the uplink shared data channel, the modulation scheme, coding rate and others for each channel.

Further, radio resource controller 130, based on the uplink channel quality input from reception processor 120 via controller 100, sets up a transmission power control value for every uplink component frequency band. Here, radio resource controller 130, in addition to setting up the uplink transmission power control value, sets up one or more uplink component frequency bands in mobile station 20 for arranging uplink resource block pairs as the radio resource allocation of the uplink shared data channel.

Further, radio resource controller 130 outputs radio resource control information including information on the transmission power control value for each uplink component frequency band and the radio resource allocation of the uplink shared data channel for each uplink component frequency band to which on or more uplink resource block pairs are allocated, to controller 100.

[2.2.1 Configuration of Transmission Processor]

Next, details of transmission processor 110 of base station 10 will be described. FIG. 5 is a schematic block diagram showing the configuration of transmission processor 110 of base station 10 according to the present embodiment.

As shown in this drawing, the transmission processor includes a plurality of downlink shared data channel processors 1100, a plurality of downlink control channel processors 1110, a downlink pilot channel processor 1120, a multiplexer 1122, an IFFT (Inverse Fast Fourier Transform) unit 1124, a GI (Guard Interval) inserter 1126 and a D/A (Digital/Analog) unit 1128 and a transmission RF (Radio Frequency) unit 1130. Transmitting antenna 115 is connected to transmission RF unit 1130.

Here, since each downlink shared data channel processor 1100 as well as each downlink control channel processor 1110 has the same configuration and function as the others, one of them will be described as a representative.

Further, as shown in this drawing, downlink shared data channel processors 1100 each include a turbo coder 1102 and data modulator 1104 while downlink control channel processors 1110 each include a convolutional coder 1112 and a QPSK modulator 1114.

Downlink shared data channel processor 1100 is a processor that performs baseband signal processing for transmitting information data to mobile station 20 based on OFDM scheme.

Turbo coder 1102 performs turbo coding of the input information data for enhancing data error tolerance, at the coding rate input from the controller and outputs the result to data modulator 1104.

Data modulator 1104 modulates the coded data that has been coded by turbo coder 1102, based on the modulation scheme input from controller 100, e.g., a modulation scheme such as QPSK, 16QAM or 64QAM, to generate a signal sequence of modulated symbols. The data modulator 1104 outputs the generated signal sequence to multiplexer 1122.

Downlink control channel processor 1110 is a processor that performs baseband signal processing for transmitting control data input from the controller based on OFDM scheme.

Convolutional coder 1112 performs convolutional coding for enhancing error tolerance of the control data, based on the coding rate input from controller 100. Here, the control data is controlled by every bit. Further, convolutional coder 1112, based on the coding rate input from controller 100, performs rate matching for adjusting the number of output bits for the bits that have undergone convolutional processing. Then, convolutional coder 1112 outputs the coded control data to QPSK modulator 1114.

QPSK modulator 1114 modulates the control data coded by convolutional coder 1112 based on QPSK modulation scheme and outputs the signal sequence of modulated modulation symbols to multiplexer 1122.

Downlink pilot channel processor 1120 generates a downlink reference signal as a known signal in mobile station apparatus 20 and outputs the signal to multiplexer 1122.

Multiplexer 1122 multiplexes the signal input from downlink pilot channel processor 1120, the signals input from all the downlink shared data channel processors 1110 and the signals input from all the downlink control channel processors 1110 into downlink radio frames, following instructions from controller 100.

The radio resource control information on the radio resource allocation of the downlink shared data channel and the radio resource allocation of the downlink control channel, set up by radio resource controller 130 is input to controller 100, and the controller 100 controls the process of multiplexer 1122 based on that radio resource control information.

Here, multiplexer 1122 performs multiplexing between the downlink shared data channel and the downlink control channel, by time-multiplexing as shown in FIG. 2. Further, multiplexer 1122 performs multiplexing of the downlink pilot channel with other channels, by time-frequency multiplexing.

Multiplexer 1122 may also perform multiplexing of the downlink shared data channel addressed to each mobile station apparatus 20 by every downlink resource block and perform multiplexing of the downlink shared data channel using a plurality of downlink resource blocks for a single mobile station apparatus 20.

Further, multiplexer 1122 performs multiplexing of the downlink control channel addressed to each mobile station apparatus 20, using a plurality of downlink resource elements scattered about within one downlink component frequency band. Further, multiplexer 1122 outputs the multiplexed signal to IFFT unit 1124.

IFFT unit 1124 performs an inverse fast Fourier transform on the signal multiplexed by multiplexer 1122, modulates the signal based on OFDM scheme and outputs the result to GI inserter 1126.

GI inserter 1126 adds a guard interval to the signal that has been modulated based on OFDM scheme by IFFT unit 1124 so as to generate a baseband digital signal consisting of OFDM symbols. As well known, the guard interval is generated by duplicating the top or tail part of the symbols to be transmitted. Further, GI inserter 1126 outputs the generated baseband digital signal to D/A unit 1128.

D/A unit 1128 converts the baseband digital signal input from GI inserter 1126 into an analog signal and outputs the signal to transmission RF unit 1130.

Transmission RF unit 1130 generates the in-phase component and quadrature component of the intermediate frequency from the analog signal input from D/A unit 1128 and removes unnecessary frequency components for the intermediate frequency band. Next, transmission RF unit 1130 converts (up-converts) the signal of the intermediate frequency into a high-frequency signal, removes unnecessary frequency components, amplifies power and transmits the signal from transmitting antenna 115 to mobile station apparatus 20.

[2.2.2 Configuration of Reception Processor]

Next, details of reception processor 120 of base station 10 will be described. FIG. 6 is a schematic block diagram showing the configuration of reception processor 120 of base station 10 according to the present embodiment.

As shown in this drawing, the reception processor includes a reception RF unit 1202, an A/D (Analog/Digital; analog-todigital conversion) unit 1204, a component frequency band separator 1206 and a plurality of uplink component frequency band-basis reception processors 1210.

Further, as shown in this drawing, uplink component frequency band-basis reception processors 1210 includes a GI remover 1212, a symbol timing detector 1216, a FFT unit 1214, a subcarrier demapping unit 1220, a reception quality measuring unit 1230, a channel estimator 1232, a channel equalizer 1240 for uplink shared data channel, a channel equalizer 1222 for uplink control channels, an IDFT unit 1224, a data demodulator 1226, a turbo decoder 1228 and an uplink control channel detector 1242. Here, as each uplink component frequency band-basis reception processor 1210 has the same configuration and function, one of them will be described as a representative.

Reception RF unit 1202 properly amplifies the signal received at receiving antenna 125, coverts (down-coverts) the signal into the intermediate frequency, removes unnecessary frequency components, controls the amplification level so as to keep the signal level properly, and performs quadrature demodulation based on the in-phase and quadrature components of the received signal. Reception RF unit 1202 outputs the quadrature-demodulated analog signal to A/D unit 1204.

A/D unit 1204 converts the analog signal that was quadrature-demodulated by reception RF unit 1202 into a digital signal and outputs the converted digital signal to component frequency band separator 1206.

Component frequency band separator 1206 separates received signals by every uplink component frequency band of the uplink system bandwidth and outputs the signals to each uplink component frequency band-basis reception processor 1210.

Uplink component frequency band-basis reception processor 1210 performs demodulation and decoding of the uplink shared data channel and uplink control channel in the uplink component frequency band and detects information data and control data to output the resultant.

Here, symbol timing detector 1216, based on the signal input from component frequency band separator 1206, detects symbol timing and outputs a control signal that represents the timing of the detected symbol boundaries, to GI remover 1212.

GI remover 1212, based on the control signal from symbol timing detector 1216, removes the portion corresponding to the guard intervals from the signal input from component frequency band separator 1206 and outputs the residual signal to FFT unit 1214.

FFT unit 1214 performs a fast Fourier transform on the input signal from GI remover 1212, demodulates the signal based on DFT-Spread-OFDM scheme and outputs the result to the subcarrier demapping unit. Here, the number of points in FFT unit 1214 is equal to the aftermentioned number of point in IFFT unit of mobile station apparatus 20.

Subcarrier demapping unit 1220, based on the control signal input from controller 100, separates the signal demodulated by FFT unit 1214, into an uplink pilot channel signal, an uplink shared data channel signal and an uplink control channel signal.

Subcarrier demapping unit 1220 outputs the separated uplink pilot channel signal to channel estimator 1232 and reception quality measuring unit 1230, outputs the separated uplink shared data channel signal to channel equalizer 1222 for uplink shared data channels, and outputs the separated uplink control channel signal to channel equalizer 1240 for uplink control channels.

Channel estimator 1232 estimates channel variation by using the uplink reference signal of the uplinkpilot channel separated by subcarrier demapping unit 1220 and the known signal. Channel estimator 1232 outputs the acquired channel-estimated value to channel equalizer 12222 for uplink shared data channels and channel equalizer 1240 for uplink control channels.

Reception quality measuring unit 1230 measures the reception quality for every uplink component frequency band by using the uplink reference signal for uplink pilot channels, and outputs the uplink channel quality as a result of the measurement of the reception quality of each uplink component frequency band, to controller 100.

Channel equalizer 1222 for uplink shared data channels equalizes the amplitude and phase of the uplink shared data channel signal separated by subcarrier demapping unit 1220, based on the channel estimated value input from channel estimator 1232. Here, the equalization means a process of canceling the channel variation of the signal affected during radio communication. Channel equalizer 1222 for uplink shared data channels outputs the adjusted signal to IDFT unit 1224.

IDFT unit 1224 performs a discrete inverse Fourier transform on the input signal from channel equalizer 1222 for uplink shared data channels and outputs the result to data demodulator 1226.

Data demodulator 1226 demodulates the uplink shared data channel signal converted by IDFT unit 1224 and outputs the demodulated uplink shared data channel signal to turbo decoder 1228. This demodulation is the demodulation that corresponds to the modulation scheme used in the data modulator 1104 in mobile station apparatus 20, and the demodulating scheme is input from the controller.

Turbo decoder 1228 decodes information data from the demodulated, uplink shared data channel signal that is input from data demodulator 1226. The coding rate is input from controller 100.

Channel equalizer 1240 for uplink control channels equalizes the amplitude and phase of the uplink control channel signal separated by subcarrier demapping unit 1220, based on the channel estimated value input from channel estimator 1232. Channel equalizer 1240 for uplink control channels outputs the equalized signal to uplink control channel detector 1242.

Uplink control channel detector 1242 detects the signal input from channel equalizer 1240 for uplink control channel, in accordance with the type of the transmitted control data, demodulates and decodes the signal to detect control data. Here, base station apparatus 10 has previously grasped the types of control data transmitted from mobile station apparatus 20. Uplink control channel detector 1242 outputs the detected control data to controller 100.

Controller 100, based on the control data that has been transmitted to mobile station apparatus 20 through the downlink control channel and the radio resource control information notified in advance through the downlink shared data channel, controls subcarrier demapping unit 1220, data demodulator 1226, turbo decoder 1228, channel estimator 1232 and uplink control channel detector 1242.

Further, the controller, based on the control data and radio resource control information that have been transmitted to mobile station apparatus 20, has grasped where, in the radio resources of the uplink component frequency bands, the uplink shared data channel and uplink control channel that have been transmitted by each mobile station apparatus 20, have been arranged.

[2.3 Overall Configuration of Mobile Station Apparatus]

Figure 7:
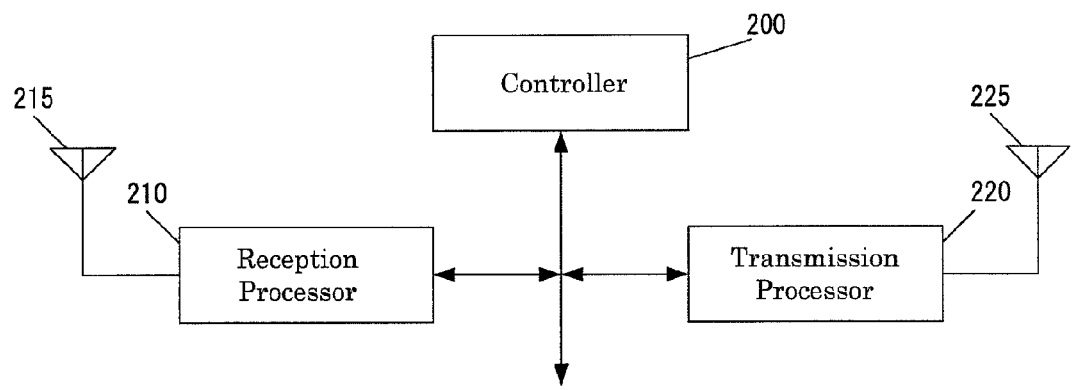
FIG. 7 is a diagram for illustrating the configuration of a mobile station apparatus in the present embodiment.
Figure 8:
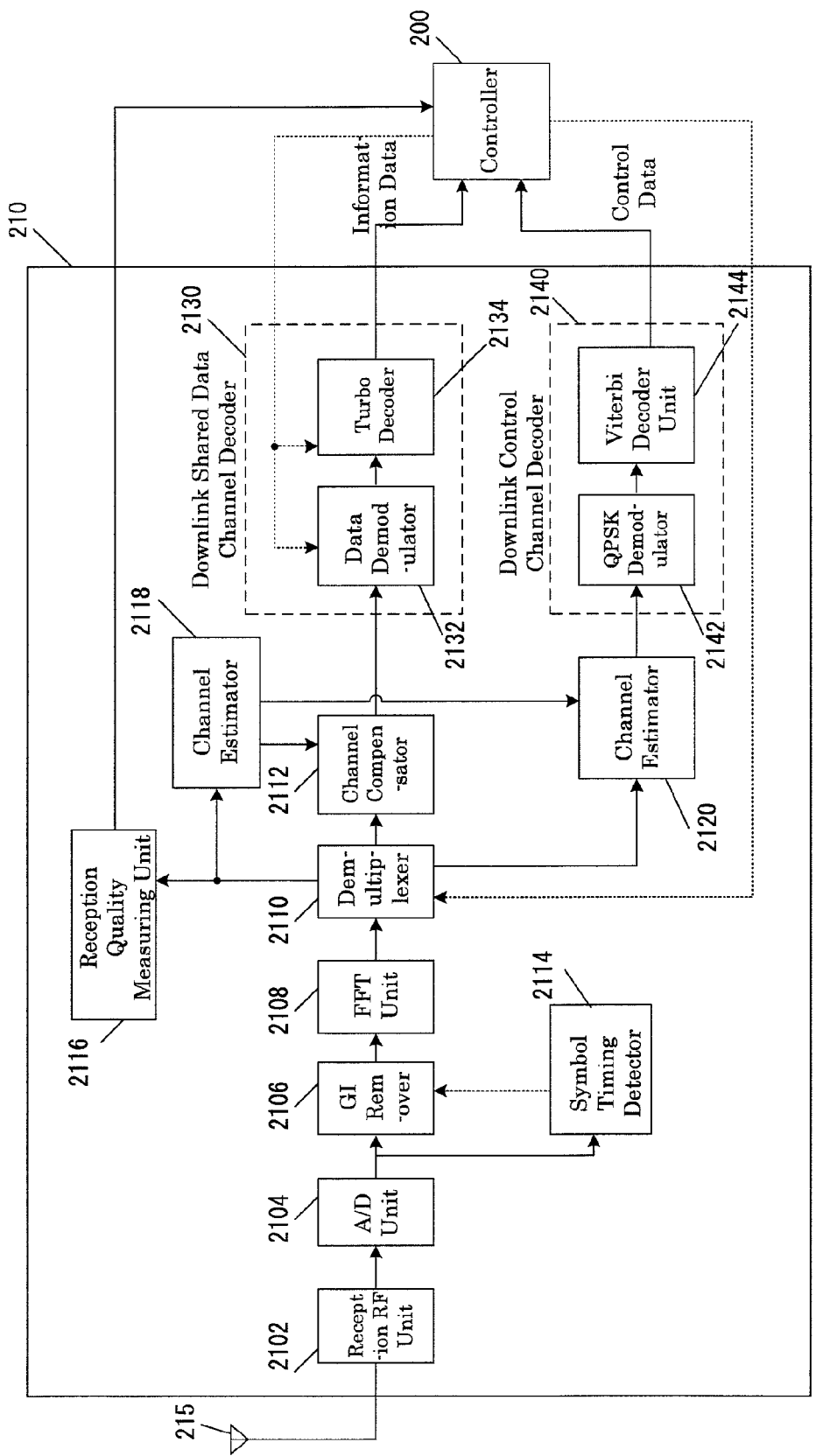
FIG. 8 is a diagram for illustrating the configuration of a reception processor of a mobile station apparatus in the present embodiment.
Figure 9:
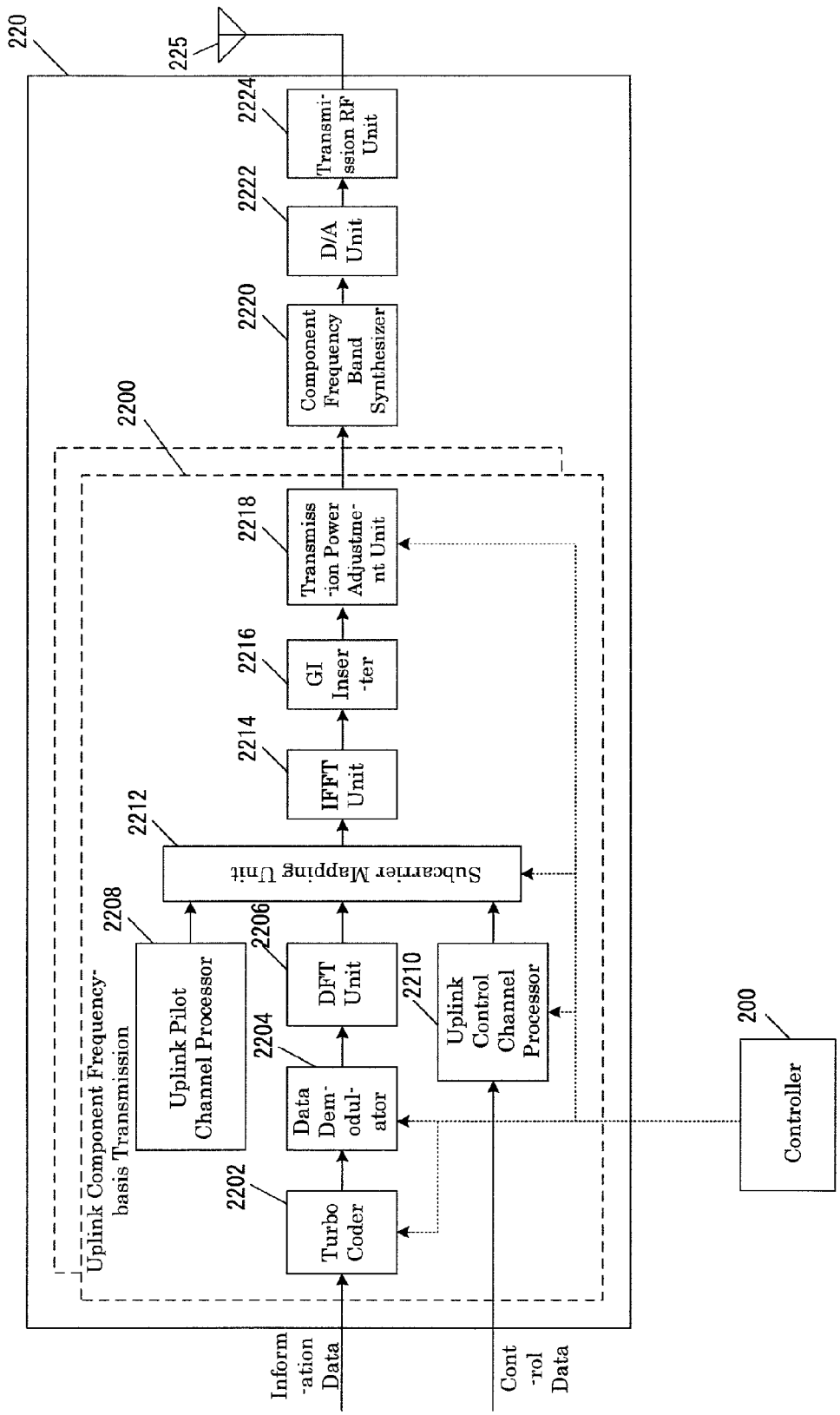
FIG. 9 is a diagram for illustrating the configuration of a transmission processor of a mobile station apparatus in the present embodiment.

Referring next to FIGS. 7, 8 and 9, the configuration of mobile station apparatus 20 according to the present embodiment will be described.

FIG. 7 is a schematic block diagram showing the configuration of mobile station apparatus 20 according to the present embodiment. As shown in this drawing, mobile station apparatus 20 is configured such that a reception processor 210 and a transmission processor 220 are connected to a controller 200.

Controller 200 checks the data that is transmitted using the downlink shared data channel and input through reception processor 210, outputs information data of the data to the upper layer, and controls reception processor 210 and transmission processor 220 based on the radio resource control information of the data. For example, controller 200, based on the information on radio resources and the cycle of radio resource allocation in each uplink component frequency band of the uplink control channel, included in the radio resource control information, controls the process relating to the uplink control channel in transmission processor 220.

Further, controller 200, based on the control data, controls reception processor 210 and transmission processor 220. When reception processor 210 has detected a downlink control channel signal that represents the radio resource allocation of the uplink shared data channel, controller 200 receives input of the control data representing radio resource allocation of the uplink shared data channel of one or multiple uplink component frequency bands and the control data representing the transmission power control value of the uplink shared data channel, from reception processor 210.

Further, in accordance with the number of uplink component frequency bands to which the radio resources of the uplink shared data channel have been allocated, controller 200 sets up the upper limit value of the average transmission power of SC-FDMA symbols of each uplink component frequency band to control transmission processor 220 based on the set upper limit values of the average transmission power of SC-FDMA symbols of the uplink component frequency bands.

Here, the number of uplink component frequency bands to which the radio resources of the uplink shared data channel are allocated and the upper limit value of the average transmission power of each uplink component frequency band will be detailed later.

Controller 200 also generates a channel quality indicator CQI based on the downlink reception quality (which will be referred to hereinbelow as downlink channel quality) input from reception processor 210, controls transmission processor 220 to transmit through the uplink control channel and outputs control data to transmission processor 220.

Reception processor 210 receives a signal from base station apparatus 10 via receiving antenna 215, and demodulates and decodes the received signal, following the instructions from controller 200. When detecting a downlink control channel signal addressed to its own apparatus, reception processor 210 outputs the control data obtained by decoding the downlink control channel signal to controller 200. When reception processor 210 has detected a downlink control channel signal that represents the allocation of radio resources of the uplink shared data channel, the control data includes information such as the transmission power control value of the uplink shared data channel and the like.

The reception processor, based on the instructions from controller 200 after the control data included in the downlink control channel has been output to the controller, outputs the information data obtained by decoding the downlink shared data channel addressed to its own apparatus, to the upper layer via controller 200. Reception processor 210 also outputs the radio resource control information obtained by decoding the downlink shared data channel, to controller 200. Further, the reception processor 210 measures the reception quality using the downlink reference signal of the downlink pilot channel of each downlink component frequency band and outputs the result of measurement to controller 200. Details of reception processor 210 will be described later.

Following the instructions from controller 200, the transmission processor 220 codes information data and control data, sets up the transmission power value of the modulated signal and arranges the signal to uplink radio resources, to thereby transmit the signal to base station 10 via the transmission antenna. Details of transmission processor 220 will be described later.

[2.3.1 Configuration of Reception Processor]

Next, details of reception processor 210 of mobile station apparatus 20 will be described.

FIG. 8 is a schematic block diagram showing the configuration of reception processor 210 of mobile station apparatus 20 according to the present embodiment. As shown in this drawing, reception processor 210 is connected to receiving antenna 215, and includes a reception RF unit 2102, an A/D unit 2104, a symbol timing detector 2114, a GI remover 2106, a FFT unit 2108, a demultiplexer 2110, a channel estimator 2118, a reception quality measuring unit 2116, a channel compensator 2112 for downlink shared data channels, a downlink shared data channel decoder 2130, a channel compensator 2120 for downlink control channels and a downlink control channel decoder 2140.

Also, as shown in this drawing, downlink shared data channel decoder 2130 includes a data demodulator 2132 and a turbo decoder 2134, whereas downlink control channel decoder 2140 includes a QPSK demodulator 2142 and a Viterbi decoder 2144.

Reception RF unit 2102 properly amplifies the signal received at receiving antenna 215, coverts (down-coverts) the signal to the intermediate frequency, removes unnecessary frequency components, controls the amplification level so as to keep the signal level properly, and performs quadrature demodulation, based on the in-phase and quadrature components of the received signal. Reception RF unit 2102 outputs the quadrature demodulated analog signal to A/D unit 2104.

A/D unit 2104 converts the analog signal that was quadrature-demodulated by reception RF unit 2102 into a digital signal and outputs the converted digital signal to symbol timing detector 2114 and GI remover 2106.

Symbol timing detector 2114, based on the digital signal converted by A/D unit 2104, detects OFDM symbol timing and outputs a control signal that represents the timing of the detected symbol boundaries, to GI remover 2106.

GI remover 2106, based on the control signal from symbol timing detector 2114, removes the portion corresponding to the guard intervals from the digital signal output from A/D unit 2104 and outputs the residual signal to FFT unit 2108.

FFT unit 2108 performs a fast Fourier transform on the signal input from GI remover 2106, and performs demodulation based on OFDM scheme and outputs the result to demultiplexer 2110.

Demultiplexer 2110, based on the control signal input from controller 200, separates the signal demodulated by FFT unit 2108 into a downlink control channel signal and a downlink shared data channel signal.

Demultiplexer 2110 outputs the separated downlink shared data channel signal to channel compensator 2112 for downlink shared data channels and outputs the separated downlink control channel signal to channel compensator 2120 for downlink control channels.

Demultiplexer 2110 separates downlink resource elements to which the downlink pilot channel is distributed, and outputs the downlink reference signal of the downlink pilot channel to channel estimator 2118 and reception quality measuring unit 2116.

Channel estimator 2118 estimates channel variation by using the downlink reference signal of the downlink pilot channel separated by demultiplexer 2110 and a known signal, and outputs a channel-compensation value for adjusting the amplitude and phase to channel compensator 2112 for downlink shared data channels and channel compensator 2120 for downlink control channels so as to compensate for variation of the channel.

Reception quality measuring unit 2116 measures the downlink channel quality by using the downlink reference signal of the downlink pilot channel, and outputs the result of measurement to controller 20.

Channel compensator 2112 for downlink shared data channels adjusts the amplitude and phase of the downlink shared data channel signal separated by the demultiplexer 2110, for every subcarrier, following the channel compensation value input from channel estimator 2118. Channel compensator 2112 for downlink shared data channels outputs the signal adjusted as to channel to data demodulator 2132 of downlink shared data channel decoder 2130.

Downlink shared data channel decoder 2130 is a processor that detects information data by performing demodulation and decoding of the downlink shared data channel, based on the instructions from controller 200.

Data demodulator 2132 decodes the downlink shared data channel signal input from channel compensator 2112 and outputs the demodulated downlink shared data channel signal to the turbo decoder 2134. This demodulation is the demodulation that corresponds to the modulation scheme used in the data modulator 1104 in base station 10.

Turbo decoder 2134 decodes information data from the demodulated downlink shared data channel signal input from data demodulator 2132 and outputs the result to the upper layer via controller 200. Here, the radio resource control information transmitted through the downlink shared data channel is also output to controller 200.

Channel compensator 2120 for downlink control channels adjusts the amplitude and phase of the downlink control channel signal separated by demultiplexer 2110, following the channel compensation value input from channel estimator 2118. Channel compensator 2120 for downlink control channels outputs the adjusted signal to QPSK demodulator 2142 of downlink control channel decoder 2140.

Downlink control channel decoder 2140 is a processor that demodulates and decodes the signal input from channel compensator 2120 to detect control data, as follows.

QPSK demodulator 2142 performs QPSK demodulation on the downlink control channel signal to output the result to Viterbi decoder unit 2144.

Viterbi decoder unit 2144 decodes the demodulated signal from QPSK demodulator 2142 and outputs the decoded control data to controller 200. Here, this signal is represented in bits. Viterbi decoder unit 2144 also performs rate dematching on the input bits for adjusting the number of bits to be subjected to Viterbi decoding.

Here, controller 200 determines whether the control data input from Viterbi decoder unit 2144 is free from error and whether it is the control data addressed to its own apparatus, and if the controller 200 has decided that the control data is free from error and addressed to its own apparatus, the controller 200 controls the demultiplexer 2110, data demodulator 2132, turbo decoder 2134 and transmission processor 220 based on the control data. When the control data is the information relating to radio resource allocation of the uplink shared data channel, controller 200, based on the control data, inputs the information data to aftermentioned uplink component frequency band-basis transmission processors 2200 of transmission processor 220 and controls transmission power.

[2.3.2 Configuration of Transmission Processor]

FIG. 9 is a schematic block diagram showing the configuration of transmission processor 220 of mobile station apparatus 20 according to the present embodiment.

As shown in this drawing, transmission processor 220 includes a plurality of uplink component frequency band-basis transmission processor 2200, a component frequency band synthesizer 2220, a D/A unit 2222 and a transmission RF unit 2224, and is connected to transmitting antenna 225.

Further, as shown in this drawing, uplink component frequency band-basis transmission processor 2200 includes a turbo coder 2202, a data modulator 2204, a DFT unit 2206, an uplink pilot channel processor 2208, an uplink control channel processor 2210 and a subcarrier mapping unit 2212, an IFFT unit 2214, a GI inserter 2216 and a transmission power adjustment unit 2218. Mobile station apparatus 20 includes as many uplink component frequency band-basis transmission processors 2200 as the supportable number of uplink component frequency bands.

Here, since each uplink component frequency band-basis transmission processor 2200 has the same configuration as the others, one of them will be described as a representative.

Uplink component frequency band-basis transmission processor 2200 is a processor that sets up coding, modulation and transmission power for information data and control data and generates signals to be transmitted using the uplink shared data channel and uplink control channel in the uplink component frequency band.

Turbo coder 2202 performs turbo coding for enhancing data error tolerance of the input information data at the coding rate directed by controller 200 and outputs the result to data modulator 2204.

Data modulator 2204 modulates the coded data that has been coded by turbo coder 2202, based on the modulation scheme input from controller 200, e.g., a modulation scheme such as QPSK, 16QAM or 64QAM, to generate a signal sequence of modulated symbols. Data modulator 2204 outputs the generated signal sequence of modulated symbols to DFT unit 2206.

DFT unit 2206 performs a discrete Fourier transform on the signal output from data modulator 2204 and outputs the result to subcarrier mapping unit 2212.

Uplink control channel processor 2210 performs baseband signal processing for transmitting the control data input from controller 200. The control data input to uplink control channel processor 2210 is any one of downlink channel quality indicator CQI, reception response ACK/NACK and scheduling request SR.

Uplink control channel processor 2210 generates a different type signal, depending on the type of control data to be processed, and outputs the result to the subcarrier mapping unit 2212. The type of control data to be processed is input from controller 200 to uplink control channel processor 2210.

Uplink pilot channel processor 2208 generates an uplink reference signal as a known signal in base station apparatus 10 and outputs the signal to subcarrier mapping unit 2212.

Subcarrier mapping unit 2212 arranges the signal input from uplink pilot channel processor 2208, the signal input from DFT unit 2206 and the input from the uplink control channel processor 2210 on the subcarriers, following the instructions from controller 200 and outputs the result to IFFT unit 2214.

Here, in order to keep the single-carrier property of transmission signal, subcarrier mapping unit 2212 will not arrange an uplink shared data channel signal and an uplink control channel signal on the same uplink subframe to be output. Similarly, subcarrier mapping unit 2212 will not arrange a plurality of uplink shared data channel signals on the same uplink subframe to be output.

Similarly, subcarrier mapping unit 2212 will not arrange a plurality of uplink control channel signals on the same uplink subframe to be output. Here, mobile station apparatus 20 arranges a plurality of uplink shared data channels, a plurality of uplink control channels or an uplink shared data channel and an uplink control channel, in the same uplink subframe in different uplink component frequency bands.

Further, as to allocation of uplink pilot channel signals inside the uplink shared data channel and allocation of uplink pilot channel signals inside the uplink control channel, these signals are arranged in a time-multiplexing manner, as shown in FIG. 3.

IFFT unit 2214 performs an inverse fast Fourier transform on the signal output from the subcarrier mapping unit 2212 and outputs the result to GI inserter 2216.

Herein, the number of points of IFFT unit 2214 is greater than the number of points of DFT unit 2206. Mobile station apparatus 20, by using DFT unit 2206, subcarrier mapping unit 2212 and IFFT unit 2214, performs DFT-Spread-OFDM modulation on the signal to be transmitted through the uplink shared data channel.

GI inserter 2226 adds a guard interval to the signal input from IFFT unit 2214 and outputs a signal added with the guard interval to transmission power adjustment unit 2218.

Transmission power adjustment unit 2218 adjusts the average transmission power of the signal input from GI inserter 2216, based on the control signal from controller 200 and outputs the result to component frequency band synthesizer 2220. Transmission power adjustment unit 2218 adjusts such that the average transmission power will fall within the upper boundary of the average transmission power set up by controller 200. Specifically, transmission power adjustment unit 2218 sets up a temporary average transmission power value, in accordance with the pass loss measured by mobile station apparatus 20, the transmission power value notified to mobile station apparatus 20 by base station apparatus 10, the number of uplink resource block pairs allocated to the uplink shared data channel, a modulation scheme-dependent power offset value based on the modulation scheme applied to the uplink shared data channel, a reference transmission power control value notified to mobile station apparatus 20 through the downlink shared data channel at the time of communication access etc., a coefficient which is broadcast to mobile station apparatuses 20 in the communication area of base station apparatus 10 through the downlink shared data channel and multiplied with the pass loss measured by mobile station apparatus 20, and compares the upper limit value of the average transmission power of each uplink component frequency band input from controller 200 with the temporary average transmission power value to set up the lower value as the average transmission power value to be actually adjusted.

Component frequency band synthesizer 2220 synthesizes the signals for every uplink component frequency band input from individual uplink component frequency band-basis transmission processors 2200 andoutputs the result to D/A unit 2222.

D/A 2222 unit converts the baseband digital signal input from component frequency band synthesizer 2220 into an analog signal and outputs the signal to transmission RF unit 2224.

Transmission RF unit 2224 generates the in-phase component and quadrature component of the intermediate frequency from the analog signal input from D/A unit 2222 and removes unnecessary frequency components for the intermediate frequency band. Next, the transmission RF unit 2224 converts (up-converts) the signal of the intermediate frequency into a high-frequency signal, removes unnecessary frequency components, amplifies power using a power amplifier inside transmission RF unit 2224 and transmits the signal to base station 10 via transmitting antenna 225.

[2.4 Information Fields in Control Data of Downlink Control Channel for Representing Allocation of Radio Resources of the Uplink Shared Data Channel]

Figures 10, 11:
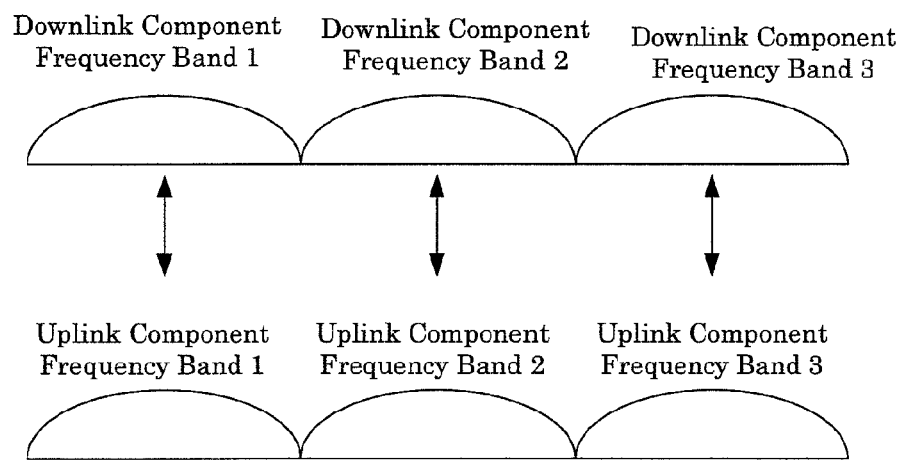
FIG. 10 is a diagram showing information fields in control data of a downlink control channel for showing radio resource allocation of an uplink shared data channel.
FIG. 11 is a diagram for illustrating the corresponding relationship between downlink component frequency bands and uplink component frequency bands.

FIG. 10 is a diagram showing information fields in control data of the downlink control channel for showing allocation of radio resources of an uplink shared data channel. The information fields in the control data of the downlink control channel for showing allocation of radio resources of the uplink shared data channel include information fields for a "radio resource allocation information" representing positions of uplink resource block pairs to be allocated in one uplink component frequency band, "modulation scheme and coding rate", a "resending parameter" representing the redundancy version number or a new data indicator, a "transmission power control value" and a "mobile station identifier". It should be noted that other information fields may be defined in the control data.

Base station apparatus 10 transmits a downlink control channel including the control data shown in FIG. 10 for each uplink component frequency band to which radio resources are allocated, to base station apparatus 20. For example, when base station apparatus 10 allocates radio resources of the uplink shared data channel to three uplink component frequency bands, base station apparatus 10 transmits three downlink control channels including control data representing allocation of radio resources of the uplink shared data channel, to mobile station apparatus 20.

[2.5 Relationship between Downlink Component Frequency Band and Uplink Component Frequency Band]

FIG. 11 is a diagram for illustrating the correspondence relationship between downlink component frequency bands and uplink component frequency bands. Herein, description will be made on a case where there are three downlink component frequency bands (downlink component frequency band 1, downlink component frequency band 2 and downlink component frequency band 3) and three uplink component frequency bands (uplink component frequency band 1, uplink component frequency band 2 and uplink downlink component frequency band 3).

The downlink component frequency band and uplink component frequency band are in one-to-one correspondence. Downlink component frequency band 1 corresponds to uplink component frequency band 1, downlink component frequency band 2 to uplink component frequency band 2, and downlink component frequency band 3 to uplink component frequency band 3.

That is, the radio resource allocation of uplink shared data channel on the downlink control channel arranged in downlink component frequency band 1 represents the radio allocation of uplink shared data channel in uplink component frequency band 1; the radio resource allocation of uplink shared data channel on the downlink control channel arranged in downlink component frequency band 2 represents the radio allocation of uplink shared data channel in uplink component frequency band 2; and the radio resource allocation of uplink shared data channel on the downlink control channel arranged in downlink component frequency band 3 represents the radio allocation of uplink shared data channel in uplink component frequency band 3.

[2.6 Details of the Number of Uplink Component Frequency Bands to which Radio Resources of Uplink Shared Data Channel are Allocated and the Upper Limit Value of Transmission Power of each Uplink Component Frequency Band]

FIG. 12 is a chart showing the number of uplink component frequency bands to which radio resources of the uplink shared data channel are allocated and the upper limit value of the average transmission power of each uplink component frequency band.

When radio resources of the uplink shared data channel are allocated at a time onto one uplink component frequency band of mobile station apparatus 20, the upper limit value of the average transmission power of each uplink component frequency band is set at x [dBm]. Here, the upper limit value of the average transmission power of each uplink component frequency band is equal to the permissible maximum transmission power value of its own apparatus.

When radio resources of the uplink shared data channel are allocated at a time onto two uplink component frequency bands of mobile station apparatus 20, the upper limit value of the average transmission power of each uplink component frequency band is set at (x-y) [dBm].

When radio resources of the uplink shared data channel are allocated at a time onto three uplink component frequency bands of mobile station apparatus 20, the upper limit value of the average transmission power of each uplink component frequency band is set at (x-z)[dBm].

Here, $z>y$, $x>0$, $y>0$ and $z>0$ hold. Controller 200 of mobile station apparatus 20 sets up an upper limit value of the average transmission power of each uplink component frequency band in accordance with the number of uplink component frequency bands to which radio resources of the uplink shared data channel are allocated, sets up an average transmission power of each uplink component frequency band-basis transmission processor 2200 of transmission processor 220 and adjusts such that the average transmission power will not exceeds the upper limit value of the average transmission power set at transmission power adjustment unit 2218 of each uplink component frequency band-basis transmission processor 2200.

Transmission power adjustment unit 2218 sets up the average transmission power using the following formula.

min{[the upper limit value of the average transmission power of each uplink component frequency band], $10 \log_{10}$([the number of allocated uplink resource block pairs])+[Reference transmission power control value]+[Coefficient multiplied with pass loss]×[Pass loss]+[Modulation scheme-dependent power offset value]+{Transmission power control value}}.

Here, min{A, B} indicates selection of a smaller value, by comparing A and B.

Controller 200 sets up a lower value for the upper limit value of the average transmission power of each uplink component frequency band as the number of uplink component frequency bands to which radio resources of the uplink shared data channel are allocated increases.

FIG. 12 shows a case where controller 200 sets up power offset values for the permissible minimum transmission power of the average transmission power of mobile station apparatus 20, in accordance with the number of uplink component frequency bands to which radio resources of the uplink shared data channel are allocated. However, the controller may sets up the values, directly in accordance with the number of uplink component frequency bands to which radio resources of the uplink shared data channel are allocated.

For example, when radio resources of the uplink shared data channel are allocated at a time onto one uplink component frequency band, mobile station apparatus 20 sets the upper limit value of the average transmission power of each uplink component frequency band at o [dBm]. When radio resources of the uplink shared data channel are allocated at a time onto two uplink component frequency bands, the upper limit value of the average transmission power of each uplink resources of the uplink shared data channel are allocated at a time onto three uplink component frequency bands, the upper limit value of the average transmission power of each uplink component frequency band is set at q [dBm]. Here, $o>p>q$ holds.

In the prior art, only one uplink component frequency band was presumed to be used for transmission, hence it was impossible with the conventional setup of the upper limit value of the average transmission power to perform proper adjustment of the average transmission power when a plurality of uplink component frequency bands were used. Further, in the prior art, the information on the permissible maximum transmission power value of the average transmission power of mobile station apparatus 20 has been exchanged through the uplink shared data channel and downlink shared data channel between base station apparatus 10 and mobile station apparatus 20, and it has been impossible for mobile station apparatus 20 to change the permissible maximum transmission power value of the average transmission power at high speeds, for example, at the uplink sub-frame rate.

According to the present embodiment, it is possible to adjust the upper limit value of the average transmission power of each uplink component frequency band to a lower value as the number of uplink component frequency bands to which radio resources of the uplink shared data channel are allocated increases. Hence, use of multiple uplink component frequency bands enables the transmission signal to be handled as a multi-carrier signal, increasing PAPR and widening the dynamic range of the transmission power, whereby it is possible to restrain the situation where the input value to the power amplifier in the transmission RF 2224 unit exceeds the capacity of the power amplifier.

Further, it is possible to adjust the upper limit value of the average transmission power of each uplink component frequency band in accordance with the number of component frequency bands to which radio resources of the uplink shared data channel are allocated, and it is possible to flexibly deal with allocation of radio resources of the uplink shared data channel which may possibly change the number of uplink component frequency bands every uplink subframe.

3. Variational Examples

As the embodiment of the this invention has been detailed heretofore with reference to the drawings, the specific configuration should not be limited to this embodiment. Designs and others that do not depart from the gist of this invention should also be included in the scope of claims.

The power offset value to the permissible maximum transmission power value of the average transmission power, corresponding to the number of uplink component frequency bands to which radio resources of the uplink shared data channel are allocated, may be set to be different from one mobile station apparatus 20 to another. At the beginning of communication connection, base station apparatus 10 transmits the information on the power offset value to base station 20 through the downlink shared data channel. Also, the information on the direct upper limit value of the average transmission power depending on the number of uplink component frequency bands to which radio resources of the uplink shared data channel are allocated, may be exchanged between base station apparatus 10 and mobile station apparatus 20.

Further, the information on the upper limit value of the average transmission power in each uplink component frequency band depending on the number of uplink component frequency bands to which radio resources of the uplink shared data channel are allocated, may be exchanged between base station apparatus 10 and mobile station apparatus 20, at the timing other than the beginning of communication connection.

Though the present embodiment showed an example where the upper limit value (permissible maximum transmission power value) of the average transmission power in each uplink component frequency band is "updated" dynamically by every uplink subframe, the maximum number of uplink component frequency bands that mobile station apparatus 20 can use for communication is set up at the start of communication with the base station, and the upper limit value of the average transmission power for each uplink component frequency band, which is defined taking the maximum number into account, may be used "without dynamic updating".

For example, when an application service that will not change in data volume is executed between base station apparatus 10 and mobile station apparatus 20, the amount of radio resources to be used in the uplink shared data channel does not change too much, the number of used uplink component frequency bands may be controlled in a quasi-static manner between base station apparatus 10 and mobile station apparatus 20.

The uplink reference signal to be used for measurement of uplink channel quality may use the uplink reference signal having a signal configuration different from the uplink reference signal shown in FIG. 3. The above embodiment was described on the assumption of the uplink reference signal to be used for demodulation of the uplink shared data channel, but an uplink reference signal to be dedicatedly used for measurement of uplink channel quality may be configured and used.

For example, it is possible to provide such a configuration that mobile station apparatus 20 transmits an uplink reference signal using the last SC-FDMA symbol in the time domain of the uplink subframe in the frequency band previously determined by base station apparatus 10. In this case, the time at which base station apparatus 20 transmits the uplink reference signal for measurement of uplink channel quality is set previously by base station apparatus 10.

Though the above embodiment was described taking a case where the number of downlink component frequency bands and the number of uplink component frequency bands are the same and the downlink component frequency bands and the uplink component frequency bands are related in one-to-one correspondence as shown in FIG. 11, other configurations may also be permitted.

For example, it is possible to configure an information field that represents a sequential number of the uplink component frequency band for the control data shown in FIG. 10, and provide a configuration such that base station apparatus 10 can arrange the downlink control channel including control data showing radio resource allocation of the uplink shared data channel, to any of downlink component frequency bands.

Detailedly, base station apparatus 10 indicates any of uplink component frequency band 1, uplink component frequency band 2 and uplink component frequency band 3, using the information field representing a sequential number of the uplink component frequency band, and arranges the downlink control channel to any of downlink component frequency band 1, downlink component frequency band 2 and downlink component frequency band 3.

Further, it is also possible to provide one downlink control channel that arranges in a mass information that presents radio resource allocations of the uplink shared data channel in multiple uplink component frequency bands.

FIG. 13 is a diagram showing information fields in the control data of a downlink control channel in which information on radio resource allocations of the uplink shared data channel in multiple uplink component frequency bands is arranged in a mass in one downlink control channel. Description herein will be made on a configuration in which one downlink control channel presents radio resource allocations of the uplink shared data channel for three uplink component frequency bands.

Information fields presenting radio resource allocation information, modulation scheme and coding rate, resending parameter and transmission power control value are defined for each uplink component frequency band, and only one information field is provided for presenting a mobile station identifier. Base station apparatus 10 arranges this downlink control channel to any one of downlink component frequency bands and transmits the channel.

In this case, the number of bits for the information field presenting the transmission power value may be adapted to be changed previously, depending on the number of uplink component frequency bands that constitute one downlink control channel. As the number of uplink component frequency bands defined on one downlink control channel increases, the information field is configured in advance so that the number of bits for the information field presenting the transmission power value becomes greater.

For example, when the number of uplink component frequency bands defined on one downlink control channel is one, the field presenting the transmission power value in the downlink control channel is formed of two bits; when the number of uplink component frequency bands defined on one downlink control channel is two, the field presenting the transmission power value in the downlink control channel is formed of three bits; and when the number of uplink component frequency bands defined on one downlink control channel is three, the field presenting the transmission power value in the downlink control channel is formed of four bits. With this arrangement, as the number of uplink component frequency bands to which radio resources of the uplink shared data channel are allocated becomes greater, the adjustable range of the value of the average transmission power can be expanded.

Further, when information field presenting the sequential number of uplink component frequency band is provided for the control data in the downlink control channel, and when information on radio resource allocations of the uplink shared data channel in multiple uplink component frequency bands is formed in a mass in one downlink control channel, one downlink control channel may be arranged over multiple downlink control channel bands.

Though the present embodiment has been described taking a case in which mobile station apparatus 20 uses one transmitting antenna and one receiving antenna in the uplink, when MIMO (Multi-Input Multi-Output) communication is implemented using multiple transmitting and receiving antennas, a different upper limit value transmission power may be set for each transmitting antenna. When mobile station apparatus 20 performs MIMO communication, uplink component frequency band-basis transmission processor 2200 is also provided for each transmitting antenna, and a different transmission RF unit (power amplifier) is provided for each transmitting antenna.

FIG. 14 is a diagram showing one example of a situation in which mobile station apparatus 20 performs MIMO transmission through a plurality of uplink component frequency bands. Here, a case where the number of transmitting antennas are four (Tx1, Tx2, Tx3, Tx4) and the number of uplink component frequency bands is three (uplink component frequency band 1, uplink component frequency band 2 and uplink component frequency band 3) will be shown.

Mobile station apparatus 20 performs MIMO communication using two transmitting antennas (Tx1, Tx2) in uplink component frequency band 1 and performs MIMO communication using two transmitting antennas (Tx1, Tx2) in uplink component frequency band 2, and performs MIMO communication using four transmitting antennas (Tx1, Tx2, Tx3, Tx4) in uplink component frequency band 3. In the power amplifiers corresponding to transmitting antenna Tx1 and transmitting antenna Tx2 three uplink component frequency band signals are power amplified, whereas in the power amplifiers corresponding to transmitting antenna Tx3 and transmitting antenna Tx4 one uplink component frequency band signal is power amplified.

Accordingly, the controller sets up the upper limit value of the average transmission power that is applied when three uplink component frequency bands are used, for the transmission power adjustment unit of each uplink component frequency band-basis transmission processor corresponding to transmitting antenna Tx1 or transmitting antenna Tx2 while the controller sets up the upper limit value of the average transmission power that is applied when one uplink component frequency band is used, for the transmission power adjustment unit of each uplink component frequency band-basis transmission processor corresponding to transmitting antenna Tx3 or transmitting antenna Tx4.

FIG. 15 is a diagram showing one example of a status in which mobile station apparatus 20 performs MIMO transmission through a plurality of uplink component frequency bands.

Mobile station apparatus 20 performs MIMO communication using two transmitting antennas (Tx1, Tx2) in uplink component frequency band 1 and performs MIMO communication using two transmitting antennas (Tx3, Tx4) in uplink component frequency band 2, and performs MIMO communication using four transmitting antennas (Tx1, Tx2, Tx3, Tx4) in uplink component frequency band 3. In all the power amplifiers corresponding to transmitting antenna Tx1, transmitting antenna Tx2, transmitting antenna Tx3 and transmitting antenna Tx4, two uplink component frequency band signals are power amplified. In this case, the controller sets up the upper limit value of the average transmission power that is applied when two uplink component frequency bands are simultaneously used, for all the transmission power adjustment units of uplink component frequency band-basis transmission processors corresponding to transmitting antenna Tx1, transmitting antenna Tx2, transmitting antenna Tx3 and transmitting antenna Tx4.

When the upper limit value of the average transmission power for each uplink component frequency band is adapted to be set up at every transmitting antenna in the above way, this configuration is effective in that even if allocation of transmission data to perform MIMO transmission for mobile station apparatus 20 is performed independently for each uplink component frequency band any of transmitting antenna will not transmit data with a power exceeding the maximum transmission power and will not degrade transmission characteristics and affect communication between another mobile station apparatus 20 and base station apparatus 10.

Further, when mobile station apparatus 20 controls the average transmission power using the accumulation of transmission power control values notified by multiple downlink subframes from base station apparatus 10, the control method may be switched to the method whereby mobile station apparatus 20 directly uses the transmission power control value notified by one downlink subframe from base station apparatus 10 to control transmission power, at the timing when the number of uplink component frequency bands to which the radio resources of the uplink shared data channel are allocated is changed.

For example, in a state where radio resources of the uplink shared data channel on one uplink component frequency band have been allocated, mobile station apparatus 20 adjusts the transmission power, based on the transmission power control values notified to mobile station apparatus 20 by base station apparatus 10, by applying the transmission power controlling method of using the accumulation of the transmission power control values notified by multiple downlink subframes from base station apparatus 10, whereas at the timing when radio resources of the uplink shared data channel on two uplink component frequency bands are allocated, mobile station apparatus 20 adjusts the average transmission power by applying the transmission power controlling method of directly using the transmission power control value notified by one downlink subframe from base station apparatus 10.

Thereafter, in the state where radio resources of the uplink shared data channel are continuously allocated to two uplink component frequency bands, mobile station apparatus 20 applies the transmission power controlling method of using the accumulation of the transmission power control values notified by multiple downlink subframes from base station apparatus 10, and then, at the timing when the uplink component frequency bands to which radio resources of the uplink shared data channel are allocated changes, applies the method of controlling the average transmission power by directly using the transmission power control value notified by one downlink subframe from base station apparatus 10.

With this, it is possible to control the number of accumulation of transmission power control values for each uplink component frequency band at the same level with one another at the timing when the number of uplink component frequency bands to which radio resources of the uplink shared data channel are allocated changes.

The program that operates on the mobile station apparatus involved in the present invention is a program for controlling CPU or the like (program for functioning a computer) so as to realize the function of the above embodiment related to the present embodiment. Information handled in these apparatus is temporarily stored into RAM during processing, and then is stored into ROM and/or HDD and loaded, modified and/or written in as necessary.

As the recording media for storing the program may use any of semiconductor media (e.g., ROM, non-volatile memory card or the like), optical recording media (e.g., DVD, MO, MD, CD, BD or the like), magnetic recording media (e.g., magnetic tape, flexible disk or the like) and the like.

Further, not only the function of the above-described embodiment is realized by executing the loaded program but also the function of the present invention may be realized by performing a process based on the instructions of the program in cooperation with an operation system or any other application program or the like.

When put on the market, the program may be stored into a portable recording medium for distribution, or can be transferred to a server computer connected to a network such as the internet or the like. In this case, the storage device of the server computer should also be included in the present invention.

As the embodiment of this invention has been described in detail with reference to the drawings, the specific configuration should not be limited to this embodiment. Designs and others that do not depart from the gist of this invention should also be included in the scope of claims.

DESCRIPTION OF REFERENCE NUMERALS 1 radio communication system
  10 base station apparatus
    100 controller
    110 transmission processor
      115 transmitting antenna
      1100 downlink shared data channel processor
        1102 turbo coder
        1104 data modulator
      1110 downlink control channel processor
        1112 convolutional coder
        1114 QPSK modulator
      1120 downlink pilot channel processor
      1122 multiplexer
      1124 IFFT unit
      1126 GI insert unit
      1128 D/A unit
      1130 transmission RF unit
    120 Reception processor
      125 Receiving antenna
      1202 Reception RF unit
      1204 A/D unit
      1206 component frequency band separator
      1210 uplink component frequency band-basis reception processor
        1212 GI remover
        1214 FFT unit
        1216 symbol timing detector
        1220 subcarrier demapping unit
        1222 channel equalizer
        1224 IDFT unit
        1226 data demodulator
        1228 turbo decoder
        1230 reception quality measuring unit
        1232 channel estimator
        1240 channel equalizer
        1242 uplink control channel detector
    130 radio resource controller mobile station apparatus
  200 controller
  210 reception processor
    215 receiving antenna
    2102 reception RF unit
    2104 A/D unit
    2106 GI remover
    2108 FFT unit
    2110 demultiplexer
    2112 channel compensator
    2114 symbol timing detector
    2116 reception quality measuring unit
    2118 channel estimator
    2120 channel compensator
    2130 downlink shared data channel decoder
      2132 data demodulator
      2134 turbo decoder
    2140 downlink control channel decoder
      2142 QPSK demodulator
      2144 Viterbi decoder unit
  220 transmission processor
    225 transmitting antenna
    2200 uplink component frequency band-basis transmission processor
      2202 turbo coder
      2204 data modulator
      2206 DFT unit
    2208 uplink pilot channel processor
    2210 uplink control channel processor
    2212 subcarrier mapping unit
    2214 IFFT unit
    2216 GI inserter
    2218 transmission power adjustment unit
    2220 component frequency band synthesizer
    2222 D/A unit
    2224 transmission RF unit

The invention claimed is:

1. A mobile station apparatus that performs communication with a base station apparatus using a plurality of component frequency bands, each band of the plurality of component frequency bands being a band having a predetermined frequency bandwidth, the mobile station apparatus comprising:

a controller to set up an upper limit value of transmission power of each component frequency band in accordance with the number of component frequency bands to which radio resources are allocated at a time; and a transmission processor to adjust the transmission power of each component frequency band based on the upper limit value of transmission power set at the controller, wherein the adjusting of the transmission power is according to the following formula:

min{[the upper limit value of the average transmission power of each uplink component frequency band], 10 $\log_{10}$([the number of allocated uplink resource block pairs])+[Reference transmission power control value]+[Coefficient multiplied with pass loss]×[Pass loss]+[Modulation scheme-dependent power offset value]+[Transmission power control value]}, and the transmission processor transmits a signal using radio resources of a plurality of component frequency bands.

2. The mobile station apparatus according to claim 1, wherein the controller sets the upper limit value of transmission power at a lower value as the number of component frequency bands to which radio resources are allocated at a time increases.

3. The mobile station apparatus according to claim 1, further comprising:

a reception unit to receive, from the base station apparatus, information relating to the upper limit value of transmission power of each component frequency band, depending on the number of component frequency bands to which radio resources are allocated at a time.

4. A communication system comprising:
a base station apparatus; and
a mobile station apparatus, wherein
the base station apparatus and the mobile station apparatus perform communications using a plurality of component frequency bands, each band of the plurality of component frequency bands being a band having a predetermined frequency bandwidth,
the base station apparatus includes:
a reception processor to receive a signal transmitted from the mobile station apparatus, using radio resources of plural component frequency bands, and
the mobile station apparatus includes:
a controller to set up an upper limit value of transmission power of each component frequency band in accordance with the number of component frequency bands to which radio resources are allocated at a time; and
a transmission processor to adjust the transmission power of each component frequency band based on the upper limit value of transmission power set at the controller, wherein
the adjusting of the transmission power is according to the following formula:

$$\min\{[\text{the upper limit value of the average transmission power of each uplink component frequency band}], 10\log_{10}([\text{the number of allocated uplink resource block pairs}]) + [\text{Reference transmission power control value}] + [\text{Coefficient multiplied with pass loss}] \times [\text{Pass loss}] + [\text{Modulation scheme-dependent power offset value}] + [\text{Transmission power control value}]\}, \text{ and}$$

the transmission processor transmits a signal using radio resources of a plurality of component frequency bands.

5. A communication method for use in a mobile station apparatus that performs communications with a base station apparatus using a plurality of component frequency bands, each band of the plurality of component frequency bands being a band having a predetermined frequency bandwidth, the communication method comprising:
setting up an upper limit value of transmission power of each component frequency band in accordance with the number of component frequency bands to which radio resources are allocated at a time;
adjusting the transmission power of each component frequency band based on the upper limit value of transmission power set, the adjusting of the transmission power is according to the following formula:

$$\min\{[\text{the upper limit value of the average transmission power of each uplink component frequency band}]10\log_{10}([\text{the number of allocated uplink resource block pairs}]) + [\text{Reference transmission power control value}] + [\text{Coefficient multiplied with pass loss}] \times [\text{Pass loss}] + [\text{Modulation scheme-dependent power offset value}] + [\text{Transmission power control value}]\}, \text{ and}$$

transmitting a signal using radio resources of a plurality of component frequency bands.

6. The mobile station apparatus according to claim 1, wherein the controller sets up the upper limit value of transmission power of each component frequency band such that the upper limit value of the average transmission power of each uplink component frequency band decreases as a number of component frequency bands increases.

* * * * *